United States Patent
Abedini et al.

(10) Patent No.: US 11,064,392 B2
(45) Date of Patent: Jul. 13, 2021

(54) RESOURCE PARTITIONING BETWEEN ACCESS AND BACKHAUL COMMUNICATION LINKS

(71) Applicant: QUALCOMM Incorporated, San Diego, CA (US)

(72) Inventors: Navid Abedini, Somerset, NJ (US); Jianghong Luo, Skillman, NJ (US); Bilal Sadiq, Basking Ridge, NJ (US); Muhammad Nazmul Islam, Littleton, MA (US); Karl Georg Hampel, Hoboken, NJ (US); Hong Cheng, Bridgewater, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/249,041

(22) Filed: Jan. 16, 2019

(65) Prior Publication Data

US 2019/0289500 A1    Sep. 19, 2019

Related U.S. Application Data

(60) Provisional application No. 62/643,656, filed on Mar. 15, 2018.

(51) Int. Cl.
*H04W 28/16* (2009.01)
*H04W 72/04* (2009.01)
(Continued)

(52) U.S. Cl.
CPC ......... *H04W 28/16* (2013.01); *H04W 72/044* (2013.01); *H04W 72/1278* (2013.01); *H04B 7/15542* (2013.01)

(58) Field of Classification Search
CPC ............. H04W 28/16; H04W 72/1278; H04W 72/044; H04B 7/15542
See application file for complete search history.

(56) References Cited

U.S. PATENT DOCUMENTS

| | | | |
|---|---|---|---|
| 2017/0006627 A1* | 1/2017 | Huang | H04W 72/1278 |
| 2017/0208574 A1* | 7/2017 | Ramakrishna | H04W 40/22 |

(Continued)

OTHER PUBLICATIONS

Huawei et al., "Evaluation on the Dynamic and Flexible Resource Allocation in IAB", 3GPP Draft, R1-1801403, 3rd Generation Partnership Project (3GPP), Mobile Competence Centre, 650, Route Des Lucioles, F-06921 Sophia-Antipolis Cedex, France, vol. RAN WG1, No. Athens, Greece, 20180226-20180302, Feb. 17, 2018 (Feb. 17, 2018), XP051397543, 6 Pages, Retrieved from the Internet:URL:http://www.3gpp.org/ftp/tsg%5Fran/WG1%5FRL1/TSGR1%5F92/Docs/ [retrieved on Feb. 17, 2018], Sections 1 and 2.

(Continued)

*Primary Examiner* — Habte Mered
(74) *Attorney, Agent, or Firm* — Linda G. Gunderson

(57) ABSTRACT

Methods, systems, and devices for wireless communications are described that provide for partitioning of time-frequency resources for access and backhaul links separately. A centralized scheduler in a centralized system or a set of access nodes (ANs) in a distributed system may allocate a portion of a set of resources for a given link type (e.g., access or backhaul). In some cases, multiple ANs may exchange reports or measurements to determine the resources to allocate to a given link type. The allocated resources may be repurposed for use by a different link type (e.g., access resources may be repurposed and used for backhaul resources) in order to account for varying traffic conditions.

29 Claims, 16 Drawing Sheets

(51) Int. Cl.
  *H04W 72/12* (2009.01)
  *H04B 7/155* (2006.01)

(56) References Cited

U.S. PATENT DOCUMENTS

| | | | |
|---|---|---|---|
| 2018/0042031 A1 | 2/2018 | Hampel et al. | |
| 2018/0049190 A1 | 2/2018 | Abedini et al. | |
| 2018/0092139 A1* | 3/2018 | Novlan | H04W 56/001 |
| 2019/0215055 A1* | 7/2019 | Majmundar | H04W 40/12 |
| 2019/0254037 A1* | 8/2019 | Gupta | H04W 72/042 |
| 2019/0349079 A1* | 11/2019 | Novlan | H04W 72/1263 |
| 2020/0053735 A1* | 2/2020 | Gupta | H04W 72/042 |
| 2020/0205132 A1* | 6/2020 | Liu | H04W 28/16 |
| 2020/0245220 A1* | 7/2020 | Pasad | H04W 72/042 |

OTHER PUBLICATIONS

International Search Report and Written Opinion—PCT/US2019/013918—ISA/EPO—dated Apr. 8, 2019 (182485WO).

* cited by examiner

ANF    UEF

RESOURCE PARTITIONING BETWEEN ACCESS AND BACKHAUL COMMUNICATION LINKS

CROSS REFERENCES

The present application for patent claims the benefit of U.S. Provisional Patent Application No. 62/643,656 by Abedini et al., entitled "RESOURCE PARTITIONING BETWEEN ACCESS AND BACKHAUL COMMUNICATION LINKS," filed Mar. 15, 2018, assigned to the assignee hereof, and expressly incorporated by reference herein.

BACKGROUND

The following relates generally to wireless communications, and more specifically to resource partitioning between access and backhaul communication links.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems, such as those operating in a millimeter wave (mmW) spectrum, may include access nodes (ANs) to facilitate wireless communication between a UE and a network. In some cases, an anchor AN may have a high-capacity, wired, backhaul connection (e.g., fiber) to the network, while communicating simultaneously with one or more ANs (e.g., relay devices) or UEs. A network that supports communications between an AN and a UE may be referred to as an access network, while a network that supports communications between one or more ANs may be referred to as a backhaul network. In deployments supporting both access and backhaul (e.g., in an Integrated Access and Backhaul (IAB) network), resource allocation may be complex due to the considerations taken into account when assigning resources including those related to potential reuse issues and neighboring cell interference.

SUMMARY

The described techniques relate to improved methods, systems, devices, or apparatuses, in accordance with various aspects of the present disclosure. Generally, the described techniques provide for resource partitioning between access and backhaul communication links in an Integrated Access and Backhaul (IAB) network. In some cases, in order to guarantee a minimum level of performance for certain link types such as access links (e.g., between an access node (AN) and a user equipment (UE)) or backhaul links (e.g., between two or more ANs), resources may be allocated to access links and backhaul links separately. For instance, a centralized scheduler (e.g., at an anchor access node, base station, or access node) may allocate specific time-frequency resources for only one type of link (e.g., access or backhaul). In some cases, the time-frequency resources allocated specifically for one type of link may be repurposed. For example, if a set of time-frequency resources are allocated for access links and there is a disproportionately high amount of backhaul traffic, some or all of the set of time-frequency resources may be repurposed for backhaul communications. This may be performed at a relay device (e.g., an AN) communicating with a UE or by a centralized scheduler (e.g., of the network or within an anchor AN).

A method of wireless communications is described. The method may include identifying a set of time-frequency resources reserved for communications of a first link type, where the first link type includes one of a backhaul link or an access link and communicating with a wireless device in a communications network via a channel associated with the first link type using the set of time-frequency resources.

An apparatus for wireless communications is described. The apparatus may include a processor, memory in electronic communication with the processor, and instructions stored in the memory. The instructions may be executable by the processor to cause the apparatus to identify a set of time-frequency resources reserved for communications of a first link type, where the first link type includes one of a backhaul link or an access link and communicate with a wireless device in a communications network via a channel associated with the first link type using the set of time-frequency resources.

Another apparatus for wireless communications is described. The apparatus may include means for identifying a set of time-frequency resources reserved for communications of a first link type, where the first link type includes one of a backhaul link or an access link and means for communicating with a wireless device in a communications network via a channel associated with the first link type using the set of time-frequency resources.

A non-transitory computer-readable medium storing code for wireless communications is described. The code may include instructions executable by a processor to identify a set of time-frequency resources reserved for communications of a first link type, where the first link type includes one of a backhaul link or an access link and communicate with a wireless device in a communications network via a channel associated with the first link type using the set of time-frequency resources.

Some examples of the method, apparatuses, and non-transitory computer-readable medium described herein may further include operations, features, means, or instructions for identifying a second set of time-frequency resources reserved for communications of a second link type different from the first link type and communicating with a network node in the communications network via a second channel associated with the second link type using the second set of time-frequency resources.

Some examples of the method, apparatuses, and non-transitory computer-readable medium described herein may further include operations, features, means, or instructions for receiving a resource configuration from the wireless device, the network node, another wireless device, or a scheduler of the communications network.

In some examples of the method, apparatuses, and non-transitory computer-readable medium described herein, the resource configuration conveys at least one of the set of time-frequency resources or the second set of time-frequency resources.

Some examples of the method, apparatuses, and non-transitory computer-readable medium described herein may further include operations, features, means, or instructions for receiving a report from a network node in the communications network, where the report may be received from the wireless device or a neighboring access node of the communications network and determining at least one of the set of time-frequency resources reserved for communications of the first link type or the second set of time-frequency resources for communication of the second link type based on the report.

Some examples of the method, apparatuses, and non-transitory computer-readable medium described herein may further include operations, features, means, or instructions for transmitting, to the wireless device or a network node, an indication of at least one of the set of time-frequency resources or the second set of time-frequency resources.

Some examples of the method, apparatuses, and non-transitory computer-readable medium described herein may further include operations, features, means, or instructions for transmitting, to the wireless device or a network node, an indication of time-frequency resources associated with a network node and reserved for communications of the first link type.

Some examples of the method, apparatuses, and non-transitory computer-readable medium described herein may further include operations, features, means, or instructions for transmitting, to a scheduler in the communications network, a request for resources for communications of the first link type or the second link type and receiving, from the scheduler, a response to the request for resources that indicates the set of time-frequency resources reserved for communications of the first link type or the second set of time-frequency resources reserved for communications of the second link type.

In some examples of the method, apparatuses, and non-transitory computer-readable medium described herein, the second set of time-frequency resources and the set of time-frequency resources at least partially overlap.

In some examples of the method, apparatuses, and non-transitory computer-readable medium described herein, the set of time-frequency resources may be associated with a first set of spatial or code resources and the second set of time-frequency resources may be associated with a second set of spatial or code resources different from the first set of spatial or code resources.

Some examples of the method, apparatuses, and non-transitory computer-readable medium described herein may further include operations, features, means, or instructions for receiving a resource configuration from the wireless device, a network node, another wireless device, or a scheduler of the communications network.

Some examples of the method, apparatuses, and non-transitory computer-readable medium described herein may further include operations, features, means, or instructions for receiving a report from a network node in the communications network, where the report may be received from the wireless device or a neighboring access node of the communications network and determining the set of time-frequency resources reserved for communications of the first link type based on the report.

In some examples of the method, apparatuses, and non-transitory computer-readable medium described herein, the report includes a buffer status report, a channel quality measurement report, a beam quality measurement report, an interference measurement report, or any combination thereof.

Some examples of the method, apparatuses, and non-transitory computer-readable medium described herein may further include operations, features, means, or instructions for transmitting, to the wireless device or a network node, an indication of the set of time-frequency resources.

Some examples of the method, apparatuses, and non-transitory computer-readable medium described herein may further include operations, features, means, or instructions for transmitting, to the wireless device or a network node, an indication of time-frequency resources associated with a network node and reserved for communications of the first link type.

Some examples of the method, apparatuses, and non-transitory computer-readable medium described herein may further include operations, features, means, or instructions for transmitting, to a scheduler in the communications network, a request for resources for communications of the first link type and receiving, from the scheduler, a response to the request for resources that indicates the set of time-frequency resources reserved for communications of the first link type.

Some examples of the method, apparatuses, and non-transitory computer-readable medium described herein may further include operations, features, means, or instructions for repurposing a subset of time-frequency resources for communications of a second link type different from the first link type and communicating with a network node in the communications network via a second channel associated with the second link type using the subset of time-frequency resources.

In some examples of the method, apparatuses, and non-transitory computer-readable medium described herein, repurposing the subset of time-frequency resources may include operations, features, means, or instructions for transmitting, to a scheduler or an access node of the communications network, a repurposing message to repurpose at least a portion of the set of time-frequency resources.

Some examples of the method, apparatuses, and non-transitory computer-readable medium described herein may further include operations, features, means, or instructions for receiving, from the scheduler or the access node of the communications network, a repurposing response message that indicates the subset of time-frequency resources reserved for communications of the second link type.

In some examples of the method, apparatuses, and non-transitory computer-readable medium described herein, the set of time-frequency resources may be associated with a first set of spatial or code resources.

In some examples of the method, apparatuses, and non-transitory computer-readable medium described herein, the set of time-frequency resources may be reserved for one of control traffic, data traffic, or broadcast signaling.

In some examples of the method, apparatuses, and non-transitory computer-readable medium described herein, the set of time-frequency resources may be reserved for one of downlink communications or uplink communications.

In some examples of the method, apparatuses, and non-transitory computer-readable medium described herein, the set of time-frequency resources may be based on a preconfigured resource allocation scheme for the communications network.

A method of wireless communications is described. The method may include allocating a set of time-frequency resources reserved for communications of a first link type, where the first link type includes one of a backhaul link or an access link and transmitting, to an access node in a communications network, a resource configuration that conveys the set of time-frequency resources.

An apparatus for wireless communications is described. The apparatus may include a processor, memory in electronic communication with the processor, and instructions stored in the memory. The instructions may be executable by the processor to cause the apparatus to allocate a set of time-frequency resources reserved for communications of a first link type, where the first link type includes one of a backhaul link or an access link and transmit, to an access node in a communications network, a resource configuration that conveys the set of time-frequency resources.

Another apparatus for wireless communications is described. The apparatus may include means for allocating a set of time-frequency resources reserved for communications of a first link type, where the first link type includes one of a backhaul link or an access link and means for transmitting, to an access node in a communications network, a resource configuration that conveys the set of time-frequency resources.

A non-transitory computer-readable medium storing code for wireless communications is described. The code may include instructions executable by a processor to allocate a set of time-frequency resources reserved for communications of a first link type, where the first link type includes one of a backhaul link or an access link and transmit, to an access node in a communications network, a resource configuration that conveys the set of time-frequency resources.

Some examples of the method, apparatuses, and non-transitory computer-readable medium described herein may further include operations, features, means, or instructions for identifying a second set of time-frequency resources reserved for communications of a second link type different from the first link type, where the resource configuration conveys at least one of the set of time-frequency resources or the second set of time-frequency resources.

In some examples of the method, apparatuses, and non-transitory computer-readable medium described herein, the second set of time-frequency resources and the set of time-frequency resources at least partially overlap.

In some examples of the method, apparatuses, and non-transitory computer-readable medium described herein, the set of time-frequency resources may be associated with a first set of spatial or code resources and the second set of time-frequency resources may be associated with a second set of spatial or code resources different from the first set of spatial or code resources.

Some examples of the method, apparatuses, and non-transitory computer-readable medium described herein may further include operations, features, means, or instructions for receiving, from the access node, a request for resources for communications of the first link type and reserving the set of time-frequency resources for communications of the first link type based on the request for resources.

Some examples of the method, apparatuses, and non-transitory computer-readable medium described herein may further include operations, features, means, or instructions for receiving, from the access node, a report corresponding to one or more devices in the communications network and reserving the set of time-frequency resources for communications of the first link type based on the report.

In some examples of the method, apparatuses, and non-transitory computer-readable medium described herein, the report includes a buffer status report, a channel quality measurement report, a beam quality measurement report, an interference measurement report, or any combination thereof.

Some examples of the method, apparatuses, and non-transitory computer-readable medium described herein may further include operations, features, means, or instructions for receiving, from the access node, a repurposing message to repurpose at least a portion of the set of time-frequency resources for communications of a second link type different from the first link type and transmitting, to the access node of the communications network, a repurposing response message that indicates a subset of time-frequency resources reserved for communications of the second link type.

In some examples of the method, apparatuses, and non-transitory computer-readable medium described herein, the set of time-frequency resources may be associated with a first set of spatial or code resources.

In some examples of the method, apparatuses, and non-transitory computer-readable medium described herein, the set of time-frequency resources may be reserved for one of control traffic, data traffic, or broadcast signaling.

In some examples of the method, apparatuses, and non-transitory computer-readable medium described herein, the set of time-frequency resources may be reserved for one of downlink communications or uplink communications.

In some examples of the method, apparatuses, and non-transitory computer-readable medium described herein, the set of time-frequency resources may be based on a preconfigured resource allocation scheme for the communications network.

DETAILED DESCRIPTION

Figure 1:
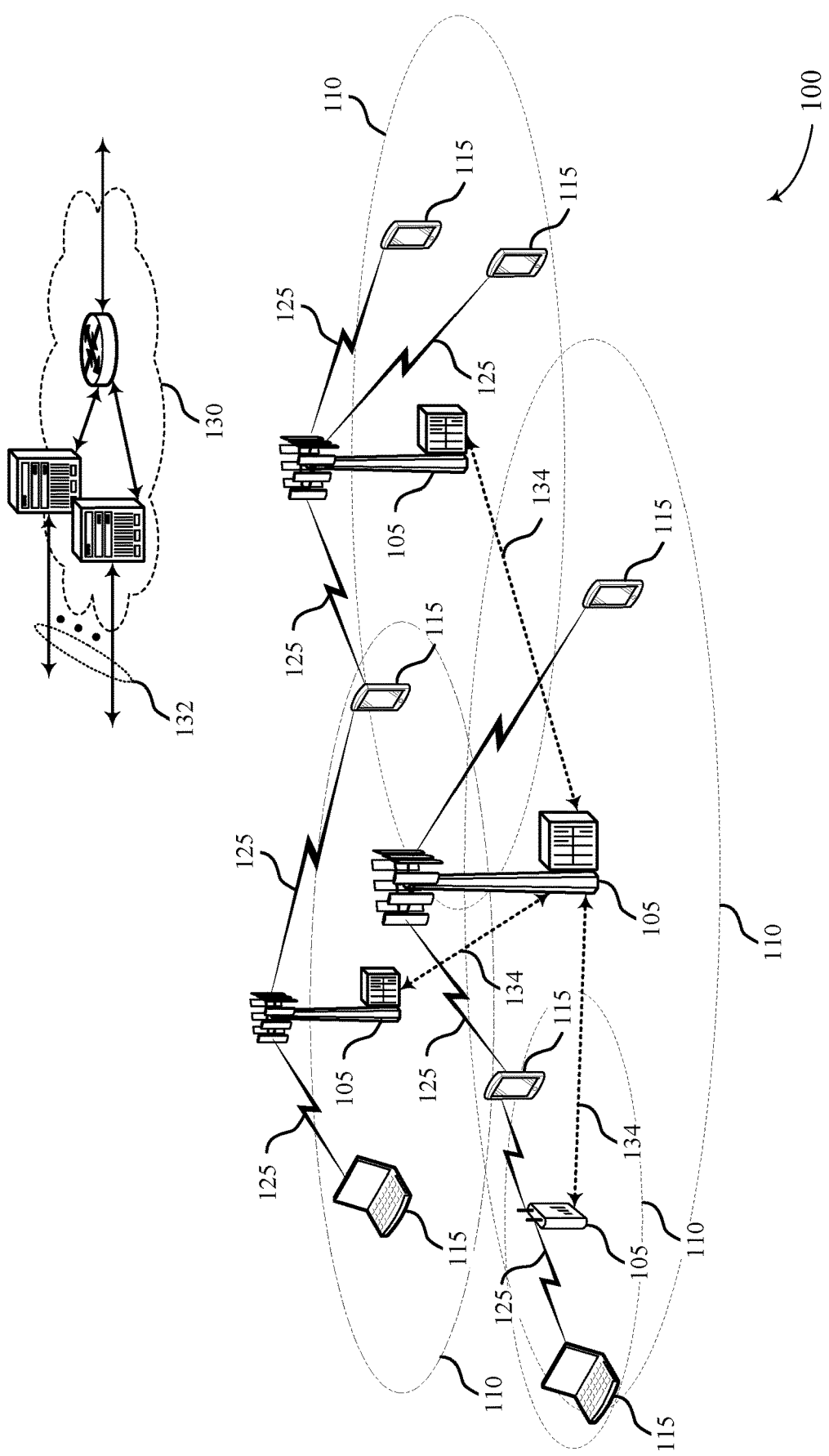
FIG. 1 illustrates an example of a wireless communications system in accordance with aspects of the present disclosure.

In some wireless communication systems, such as those deploying New Radio (NR) technologies, wireless backhaul links may be used to couple an access node (AN) to a network in place of high-capacity, wired backhaul link (e.g., fiber). For example, a first AN (e.g., relay node) in communication with a user equipment (UE), or another AN, may establish a backhaul link (wired or wireless) with a second AN (e.g., anchor), which has a high-capacity, wired backhaul link to the network. In this manner, the first AN may communicate access traffic from the UE (or another AN) to the network via the second AN through the combination of the one or more backhaul links. In some examples, a backhaul network may use multiple backhaul links before reaching a wired backhaul link. The first AN may be referred to as a UE-Function (UEF) with respect to the anchor and an AN-Function (ANF) with respect to the UE (or another AN) with which the first AN is communicating. Thus, a relay node may act as a UE for its one or more parent relays (e.g., relays that connect the relay node one hop closer to the anchor) and as a base station for its child relays and/or UEs within its coverage area.

In some examples, the backhaul network may provide robustness via topological redundancy, for example, by providing alternate paths for traffic to travel (e.g., in case of broken communication links). In such an ad-hoc network, large-scale resource coordination schemes may serve to optimize communications between UEs and the network. In some aspects, resources available for communication may be dynamically allocated to the backhaul and access links. Further, the resources may refer to any combination of time, frequency, code, or space. In some cases, wireless communication systems may deploy one or more techniques to support coordination of signaling and resource allocation for wireless backhaul networks in order to support integrated access and backhaul (IAB).

One or more wireless backhaul links may be established between ANs. Each wireless backhaul link may be pre-assigned a resource based on a synchronized frame structure, a resource plan, or a schedule. In some cases, the ANF may be allocated a fraction of resources from the total set of resources, which may be determined by a large-scale resource schedule (or a super schedule). In some cases, the large-scale resource allocation schedule may be determined at a core network component or an anchor. In some aspects, the ANF may control resource allocation on the one or more links under its control (e.g., communication links with child relays), by sub-scheduling the fraction of resources amongst them. The sub-scheduling may be based in part on load conditions, network topology (e.g., due to changes in channel conditions, link failure, or addition/departure of nodes), etc. In some cases, the sub-schedule of resources may be indicated to the ANF by the network, via its parent relay, or determined (e.g., autonomously) at the ANF.

In some cases, the UEF may communicate using the link, after receiving the permission to use the link from an ANF. Further, if an ANF determines that it is not using one of its assigned resources for a certain time period, the ANF may make the resource available to neighboring wireless backhaul links by signaling availability/occupancy indications to neighboring ANs. In some cases, to reduce interference with other signals, frequencies different from those used for the access network may be used to establish wireless backhaul links. For example, millimeter waves (mmWs), such as those used in 5th Generation (5G) cellular technologies, may be used to establish wireless backhaul links between ANs. In some aspects, beamforming techniques may be used to direct a wireless communication link to a neighboring AN. It should be appreciated that wireless links between ANs may be suitable for beamforming techniques because ANs are stationary (e.g., they do not change physical locations), and may deploy antenna arrays capable of producing highly directional beams.

In some cases, there may be at least one non-empty set of resources reserved for one type of link. For instance, a first set of resources from the overall set of resources may be allocated to (or reserved for) one or more access links. In some cases, the first set of resources may be reassigned or repurposed for backhaul links based on light access traffic. In some other cases, the overall set of resources may be partitioned into two distinct sets of resources, one exclusively for access, and the other for backhaul.

In some cases, resources reserved for a particular type of link (e.g., access or backhaul) may be reserved for a specific type of traffic (e.g., control traffic, data traffic, broadcast signaling) for the link. In some other cases, resources reserved for a particular type of link may be only for a specific direction (e.g., downlink, uplink). The resource allocation scheme implemented may be based on the available bandwidth (combination of access band and backhaul band, sub-6 gigahertz (GHz) or mmW, etc.).

Aspects of the disclosure are initially described in the context of wireless communications systems. Aspects of the disclosure are further illustrated by and described with reference to a network schedule, a resource partitioning scheme, apparatus diagrams, system diagrams, and flowcharts that relate to resource partitioning between access and backhaul communication links.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point or AN, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an AN controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers (CCs) and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may employ one or more wired and wireless backhaul links (e.g., backhaul link 132 or backhaul link 134) for establishing connectivity between a core network 130 and one or more wireless nodes within wireless communications system 100. For example, wireless communications system 100 may include multiple relay devices such as base stations 105, remote radio heads, etc., which may be referred to as ANs 105. At least one AN 105 may be coupled to a wireline backhaul link, such as an optical fiber cable, and may be referred to as an anchor AN 105. Additional ANs 105 may be coupled to the core network 130 or to another AN 105 via a wireless backhaul link, and may use the backhaul links to communicate backhaul traffic. In such cases, the ANs 105 may wirelessly communicate backhaul access traffic to a high-capacity fiber point (e.g., a location where a wireless node is coupled with a wireline link to core network 130). Each of the backhaul links 132 and 134 may carry packets from the one or more established PDN gateways through the S-GW interface and subsequently direct the packets through the core network and to the coupled wireless nodes over the Si interface.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

Additionally, wireless communications system 100 may employ one or more wireless access links for establishing mobile access to one or more coupled UEs 115. Each of the ANs 105 and the UEs 115 may be configured to support cellular radio access technologies (RATs), such as mmW-based RATs, for access traffic between the UEs 115 and the ANs 105. Moreover, each of ANs 105 may share resources of the configured RATs for access traffic with backhaul traffic over the network (e.g., as in the case of an IAB network). IAB network solutions may be increasingly beneficial with the evolution of cellular technologies due to enhancements in wireless link capacity. Specifically, IAB network solutions may provide solutions to densification of network cells (e.g., cost reduction of small cell deployments) and increases in data traffic, as a means to maximize spectrum efficiency through joint optimization and integration of access and backhaul resources within the network. IAB network solutions may be particularly suitable for mmW RATs due to a large bandwidth per channel and the need to mitigate short term signal blocking.

An access link using a mmW-based RAT may be designed as an asymmetric single-hop link, which may be used for assigning control and scheduling tasks to an AN 105 while providing instruction to one or more UEs 115 for scheduling communication. In such cases, an AN 105 may coordinate wireless resources among multiple UEs 115, while each UE 115 may be assigned to one AN 105 at a time. In some cases, inter-node links may be symmetric in nature and may form mesh topologies for enhanced robustness, where wireless transport may occur along multiple hops.

Communication according to a particular RAT (e.g., mmW RAT) over an IAB network may enable one or more functionalities at the ANs 105 of the network. For example, each AN 105 may be configured to support an AN-Function (ANF) and a UE-Function (UEF) which allows each AN 105 to act as a scheduling entity (e.g., via ANF techniques) and a receiving (e.g., scheduled) entity (e.g., via UEF techniques). Each of the functionalities may be operated via each of the one or more backhaul links 132 and 134. ANF functionality may enable the respective ANs 105 to operate as a scheduling entity over one or more access links, and communicate with one or more UEs 115 located within the IAB network. ANF functionality may further enable the respective ANs 105 to operate as a scheduling entity over one or more coupled backhaul links, to facilitate communication between the one or more other ANs 105 of the IAB network (e.g., via the mesh topology). UEF functionality may enable the respective ANs 105 to operate as a scheduled entity and communicate with one or more other ANs 105 to receive data. The combination of the UEF and ANF capability at each AN 105 of the IAB network may allow each of the ANs 105 to utilize switching operations over the wireless spectrum associated with the RAT, to transmit access traffic to/from UEs 115 and backhaul traffic to/from core network 130 providing coupled access to the one or more PDNs. Additionally, each of ANs 105 may include a routing table (RT) for examining a received data packet and forwarding the packet along the best path of the IAB network toward the specified IP address of the packet's destination.

In some cases, occupancy/availability signaling may be used to enable dynamic resource allocation of the resources defined in the synchronized frame structure between different wireless communication links. For example, if a particular AN 105 is not using some of its dedicated resources, it may signal to neighboring ANs 105 that such resources are available to be used. Upon receiving an indication signal that non-dedicated resources are available to be used, the neighboring AN 105 may schedule data to be transmitted using those available resources.

Scheduling entities, including one or more ANs 105 implementing ANF, may transmit one or more beamforming reference signals (BRSs) to a receptive entity (e.g., a UE 115 or an alternative AN 105 implementing UEF) as part of a beamformed transmission. The ANF configured ANs 105 may transmit the beamformed transmission utilizing a beam-sweeping configuration in one or more spatial directions. The scheduling entities may periodically perform the beamformed transmission (e.g., as configured via radio resource control (RRC) signaling), semi-persistently (e.g., as configured via RRC signaling and activated/deactivated via medium access control-control element (MAC-CE) signaling), or aperiodically (e.g., via downlink control information (DCI)). The respective signaling of the one or more BRSs may be directionally oriented with regard to a communication direction of the network including uplink, downlink, and sidelink (e.g., D2D) signaling.

In some cases, in order to guarantee a minimum level of performance for access links (e.g., between an AN 105 and a UE 115), resource allocation between access links and backhaul links may be separated. For instance, a centralized scheduler (e.g., at anchor level or base station level) may allocate separate sets of resources to the access and backhaul links.

Figure 2:
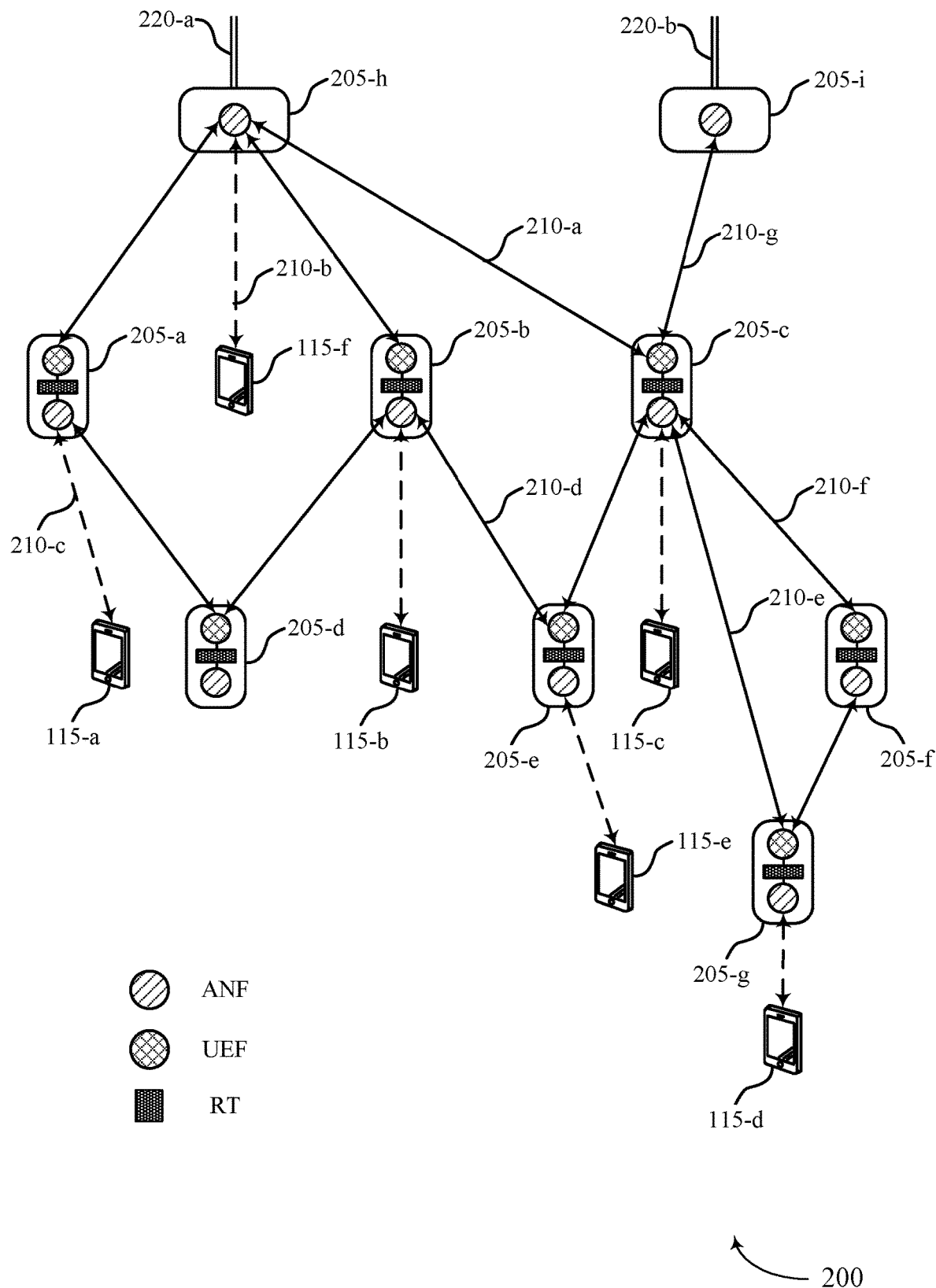
FIG. 2 illustrates an example of a wireless communications system in accordance with aspects of the present disclosure.

FIG. 2 illustrates an example of a wireless communications system 200 that supports resource partitioning between access and backhaul communication links in accordance with various aspects of the present disclosure. In some cases, the wireless communications system 200 may be an example of a wireless communications network that operates in mmW spectrum, or supports 5G NR deployments. The wireless communications system 200 may include a number of ANs 205 (ANs 205-a, 205-b, 205-c, etc.) and UEs 115 that communicate over a combination of wired links 220 (e.g., wired links 220-a and 220-b) and wireless links 210. In some cases, the wired links 220 may be core network links, and may connect anchor ANs 205-h and 205-i to the core network. The ANs 205 may be examples of the ANs 105 described in reference to FIG. 1.

In some examples, complex backhaul topologies may be handled by composing the topology from multiple stars that mutually overlap. For instance, wireless communications system 200 may include a mesh topology with at least two interfaces to a wireline network. Additional ANs 205 may be either directly or indirectly coupled to the respective interfaces of the mesh topology via wireless links 210 (e.g., wireless link 210-a). Such a topology may comprise multiple stars, where some stars mutually overlap. An ANF may be supported by an AN 205 of the mesh topology (ANs 205-b, 205-h, 205-i, etc.). UEF functionality may be configured at some or all of the ANs 205 of the wireless communications system 200. As a result, an AN 205 may include multiple ANFs and UEFs configured for uplink and downlink data packet transmission according to an active mode or a suspended mode using the node functions.

In some cases, each of the one or more wireless links 210 may be associated with wireless resources of a RAT, establishing resource functionality for access and backhaul traffic within the mesh topology. For example, AN 205-b may include one or more instances of a UEF, where it may communicate with the ANFs at ANs 205-h, 205-d, and 205-e. In some cases, ANs 205 may each communicate with each other using at least one ANF and at least one UEF, and may form overlapping stars. Wireless links may be associated with different sets of resources, where the resources are cooperatively allocated according to a schedule established by the ANFs. Multiple stars may use techniques to coordinate wireless resources, which may efficiently handle system constraints such as half-duplexed communications, inter-link interference, etc. For instance, inter-link interference may be managed using spatial division multiple access (SDMA) techniques (e.g., through the use of narrow beams), and inter-node beam coordination may account for any remaining interference. In some examples, an AN 205 may also include an RT, which may be used in the determination of a location for packets to be directed. Each AN 205 may further include a relay functionality, where a given AN 205 may relay transmissions between ANs 205, for example, from a UE 115 to another AN 205, such as AN 205-e supporting communication between the network and UE 115-e via AN 205-b.

Additionally or alternatively, mobile access may be integrated at one or more ANs 205 of the wireless communications system 200. Each AN 205 of the integrated mobile access may be configured to form a star topology with UEs 115. For example, AN 205-a may correspond to a center of a star topology of integrated mobile access within the network. One or more UEs 115-a may be coupled to AN 205-a via one or more wireless links (e.g., wireless link 210-c). In some examples, mobile access links may also be added to existing stars. In an example, AN 205-c may communicate with AN 205-h using wireless link 210-a. AN 205-g may further communicate with UE 115-d and AN 205-c over wireless links 210 (e.g., wireless link 210-e). In this example, wireless links 210-a and 210-e both share the same set of wireless resources to provide support for IAB. In some cases, a range of ANF and UEF combinations may be instantiated in an AN 205. Additional or different combinations of UEF and ANF instances in ANs 205, as well as different topologies not shown in FIG. 2, may be possible.

The ANF and UEF configurations of the ANs 205 may be assigned the same functionalities and signaling protocols for resource allocation as defined by a RAT. That is, resource coordination of the one or more star topologies contained within the mesh topology may be managed via the RAT, such as a mmW RAT. Furthermore, wireless resource use among ANs 205 within a star may be coordinated via a large-scale (e.g., network-wide) schedule. Within each star, signaling and resource management may be regulated by the RAT and a resource sub-schedule may be generated by a star's ANF. Each wireless link 210 may be coordinated using time synchronization, with a frame structure supported by the RAT. ANs nodes 205 may use a routing function that makes decisions on forwarding of data among node functions residing on the same node. The routing function may be executed or instantiated, for example, on any one of a number of protocol layers (e.g., the routing function may be executed on an IP layer). In some cases, the AN 205 may access a routing table, and may forward data between node functions based on the routing table. Additionally or alternatively, a routing function or a routing table may be used to forward data between different ANs 205.

In some examples, a large-scale or network-wide TDM scheduling (e.g., a super schedule) may be used to assign resources to the various ANs 205 within in a coordinated manner. For example, adjacent stars (e.g., different stars with leaves that share at least one node) or overlapping stars (e.g., stars with one common leaves) may use different wireless resources. At the same time, disjoint stars (e.g., stars that are neither adjacent nor overlapping) may reuse the same wireless resources. The schedule may be followed by all participating ANs 105 through a mutual time synchronization and the frame structure, which may be defined by the RAT.

In some aspects, an ANF may control resource allocation on the one or more links with its child relays, by sub-scheduling the fraction of resources amongst them. In some cases, the sub-scheduling may be based in part on load conditions, network topology, etc. In some cases, the sub-schedule of resources may be indicated to the ANF by the network, via its parent relay, or determined autonomously at the ANF.

In some cases, the UEF may communicate using the link, after receiving the permission of the link's ANF. Further, if an ANF determines that it is not using one of its assigned resources for a certain time period, the ANF may make the resource available to neighboring wireless backhaul links by signaling availability/occupancy indications to neighboring ANs 205. For instance, AN 205-a may make wireless resources to be used over wireless link 210-c, available to AN 205-b (e.g., over wireless link 210-d). In some cases, to reduce interference with other signals, frequencies different from those used for the access network may be used to establish wireless backhaul links. For example, mmWs, such as those used in 5G cellular technologies, may be used to establish wireless backhaul links between ANs.

In some cases, there may be at least one non-empty set of resources reserved for at least one type of link. For instance, AN 205-b may be assigned a set of wireless resources from AN 205-h, and may reserve a first subset of resources from the set for access traffic communications with UE 115-b. In some cases, the first subset of resources may be reassigned or repurposed for backhaul links (e.g., wireless link 210-d), for example, based on light access traffic. In some other cases, the overall set of resources may be partitioned into two distinct sets of resources, one exclusively for access, and the other for backhaul.

In some cases, the resource allocation may be determined using one or more schemes. In a first example scheme, resource allocation may be determined by a centralized scheduler (e.g., system wide), which may be referred to as a centralized scheme. In some other cases, a distributed scheme may be implemented, where one or more ANs 205 may exchange signaling, and resource allocation may be determined based on the exchanged signaling. Signaling may include requests from an AN 205 to the scheduler or to other ANs 205. In other cases, signaling may involve one or more ANs 205 exchanging various messages, measurements, or reports such as buffer status reports (BSRs), channel quality, beam quality, and/or interference measurements and reports. Additionally or alternatively, signaling may include a resource configuration from the scheduler or an AN 205 to one or more other ANs 205, or an indication of the resource configuration from an AN 205 to one or more UEs 115 in the same cell, or neighboring cell. In some cases, resource allocation determination may be preconfigured, for example, standardized in a wireless system specification (e.g., 3rd Generation Partnership Project (3GPP) specification).

One or more ANs 205 and the scheduler may exchange signaling (e.g., measurement reports) to enable repurposing of resources. In some cases, resources reserved for a particular type of link (e.g., access or backhaul) may be reserved for a specific type of traffic (e.g., control traffic, or data traffic, or broadcast signaling) for the link. In some other cases, resources reserved for a particular type of link may be only for a specific direction (e.g., for downlink or uplink). The resource allocation scheme implemented may be based on the available bandwidth (e.g., combination of access band and backhaul band, sub-6 GHz or mmW).

Figure 3:
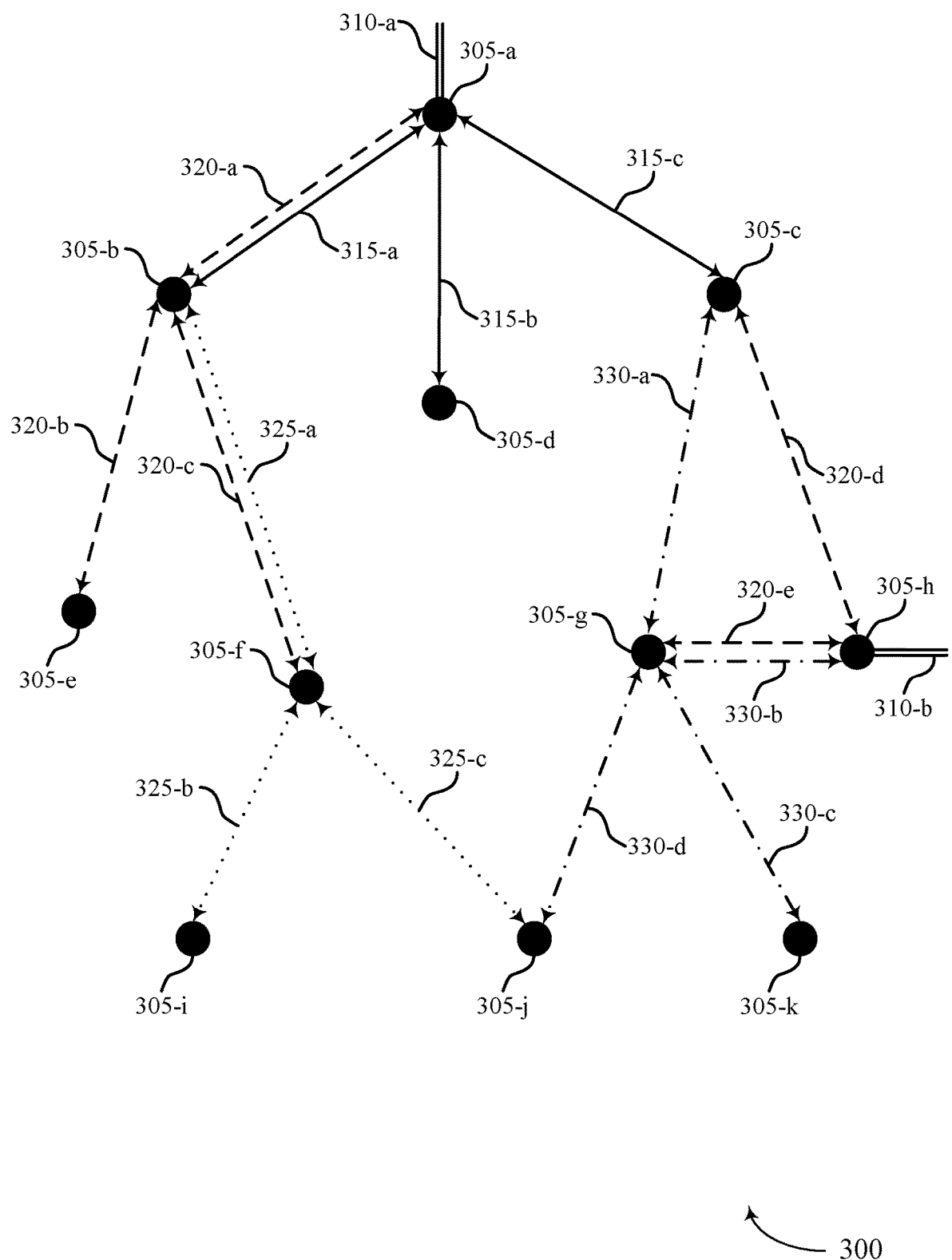
FIG. 3 illustrates an example of a network schedule in accordance with aspects of the present disclosure.

FIG. 3 illustrates an example of a network schedule 300 that supports resource partitioning for access and backhaul communication links in accordance with various aspects of the present disclosure. In some examples, network schedule 300 may implement aspects of wireless communications system 100 and/or 200. Network schedule 300 may include multiple nodes 305 communicating with each other over a system of wireless links (e.g., backhaul and/or access links). Each backhaul node may include multiple ANFs, UEFs, or a combination thereof. Nodes 305-a and 305-h may be coupled with wireline backhaul links 310-a and 310-b, respectively, to provide interfaces to a wireline network. As shown in network schedule 300, nodes 305-a, 305-b, 305-f, 305-g, and 305-h may include both ANF and UEF functionalities (e.g., transmitting and receiving data over respective links). Alternatively, nodes 305-c, 305-d, 305-e, 305-i, 305-j, and 305-k may only include UEF functionality (e.g., only receive data over respective links).

Network schedule 300 may include multiple stars, as described herein. Accordingly, some stars may overlap, where an ANF is located at the center of each star and UEFs are located at the leaves of the stars. Each star center (e.g., ANF) may utilize a same set of resources for each link stemming from the center of the star (e.g., according to a coloring scheme). For example, node 305-a may utilize a first resource on a first set of links 315, node 305-b may utilize a second resource on a second set of links 320, node 305-f may utilize a third resource on a third set of links 325, and node 305-g may utilize a fourth resource on a fourth set of links 330.

Additionally, each node 305 may determine how to partition its respective resource set for each of its corresponding links. For example, node 305-a may utilize a first partition of the first resource to communicate with node 305-b (e.g., link 315-a), a second partition of the first resource to communicate with node 305-d (e.g., link 315-b), and a third partition of the first resource to communicate with node 305-c (e.g., link 315-c). Node 305-b may utilize a first partition of the second resource to communicate with node 305-a (e.g., link 320-a), a second partition of the second resource to communicate with node 305-e (e.g., link 320-b), and a third partition of the second resource to communicate with node 305-f (e.g., link 320-c). Node 305-f may utilize a first partition of the third resource to communicate with node 305-b (e.g., link 325-a), a second partition of the third resource to communicate with node 305-i (e.g., link 325-b), and a third partition of the third resource to communicate with node 305-j (e.g., link 325-c). Node 305-g may utilize a first partition of the fourth resource to communicate with node 305-c (e.g., link 330-a), a second partition of the fourth resource to communicate with node 305-h (e.g., link 330-b), a third partition of the fourth resource to communicate with node 305-k (e.g., link 330-c), and a fourth partition of the fourth resource to communicate with node 305-j (e.g., link 330-d).

As shown, overlapping or touching stars (e.g., connected over backhaul links) do not share the same resources. However, if the stars are disjointed (e.g., not connected over backhaul links), the same resources may be used for the star. For example, node 305-h may utilize the second resource on a fifth set of backhaul links along with node 305-b because no backhaul links exist between the two nodes 305. As described above, node 305-h may decide how to partition the second resource for each of its corresponding links. In some cases, the partitioning may take into account how node 305-b partitions the second resource for its links. For example, node 305-h may utilize a fourth partition of the second resource to communicate with node 305-c (e.g., link 320-d) and a fifth partition of the second resource to communicate with node 305-g (e.g., link 320-e). Alternatively, node 305-c may partition the second resource independently of how node 305-b partitions the second resource for its links. In some cases, the nodes may partition the resources based on time, frequency, space, code, or a combination thereof. Further, resources may be partitioned (e.g., by a centralized scheduler or an ANF of an AN 305) based on the type of link (access or backhaul).

Figure 4:
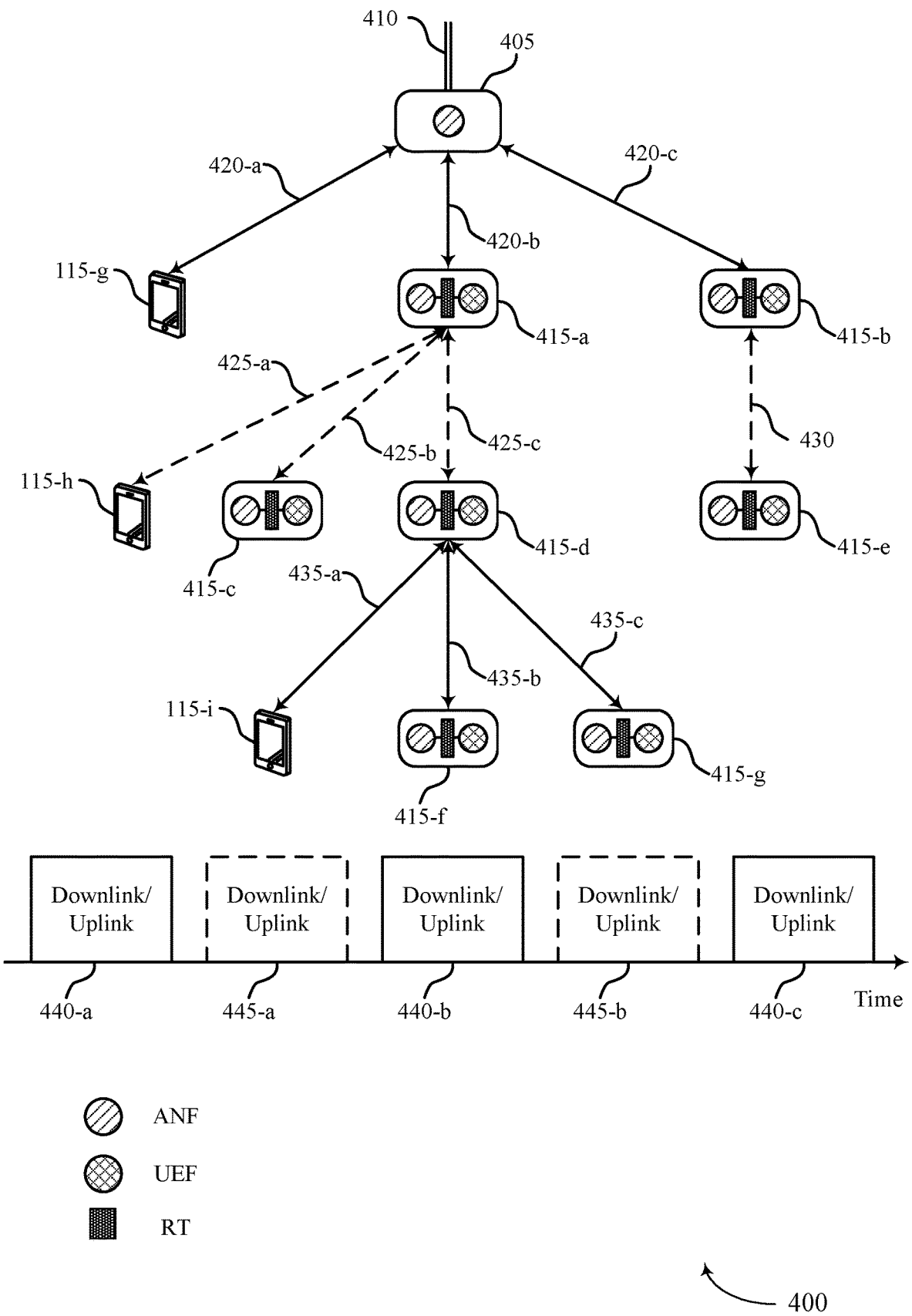
FIG. 4 illustrates an example of a wireless communications system in accordance with aspects of the present disclosure.

FIG. 4 illustrates an example of a wireless communications system 400 in accordance with various aspects of the present disclosure. In some examples, wireless communications system 400 may implement aspects of wireless communications system 100 and/or 200. Wireless communications system 400 may include an anchor cell 405 that is coupled with wireline backhaul link 410 to provide interfaces to a wireline network for a system. Further, backhaul and/or access links connect anchor cell 405 to one or more UEs 115 (e.g., UEs 115-g, 115-h, and 115-i) and cells 415, which may relay information or be further connected to additional UEs 115 and cells 415 over additional backhaul and/or access links (e.g., according to network scheme 300 of FIG. 3). The backhaul and/or access link may include wireless links. Each cell 415 may include an ANF, UEF, RT, or a combination thereof.

In some cases, anchor cell 405 may be connected to a first set of nodes over links 420. For example, anchor cell 405 may communicate with a UE 115-g over link 420-a, a cell 415-a over link 420-b, and a cell 415-b over link 420-c. Since cells 415-a and 415-b include an ANF, they may further be connected to a second set of nodes over links 425 and 430, respectively. For example, cell 415-a may communicate with a UE 115-h over link 425-a, a cell 415-c over link 425-b, and a cell 415-d over link 425-c. Additionally, cell 415-b may communicate with cell 415-e over link 430. Similarly, cell 415-d may further include an ANF and be connected to a third set of nodes over links 435. For example, cell 415-d may communicate with a UE 115-i over link 435-a, cell 415-f over link 435-b, and cell 415-g over link 435-c.

A set of time-frequency resources may be partitioned for all or some of the links between anchor cell 405, cells 415, and the UEs 115. For example, the set of time-frequency resources may be partitioned into two sets for downlink and/or uplink transmissions (e.g., downlink/uplink resources 440 and 445). As shown, the time-frequency resources are partitioned based on the time domain (e.g., a number of symbols for each set), where the sets alternate according to defined repetition pattern. The first set of resources may include downlink/uplink resources 440-a, 440-b, and 440-c. Alternatively, the second set of resources may include downlink/uplink resources 445-a and 445-b.

Each set of resources may be allocated to corresponding links and may alternate per each hop. For example, links 420 may utilize the first set of downlink/uplink resources 440, links 425 and 430 may utilize the second set of downlink/uplink resources 445, and links 435 may utilize the first set of downlink/uplink resources 440. Within a star, a cell 415 that includes an ANF may allocate the resources to each of its constituent links (e.g., cell 415-d may allocate resources of the first set of downlink/uplink resources 440 for each link 435). By employing resource partitioning scheme in wireless communications system 400, constraints associated with half-duplex operations may be overcome. For example, cell 415-a may receive communications from anchor cell 405 over the first set of downlink/uplink resources 440 at a first time and may transmit communications on links 425 over the second set of downlink/uplink resources 445 at a second time.

Figure 5:
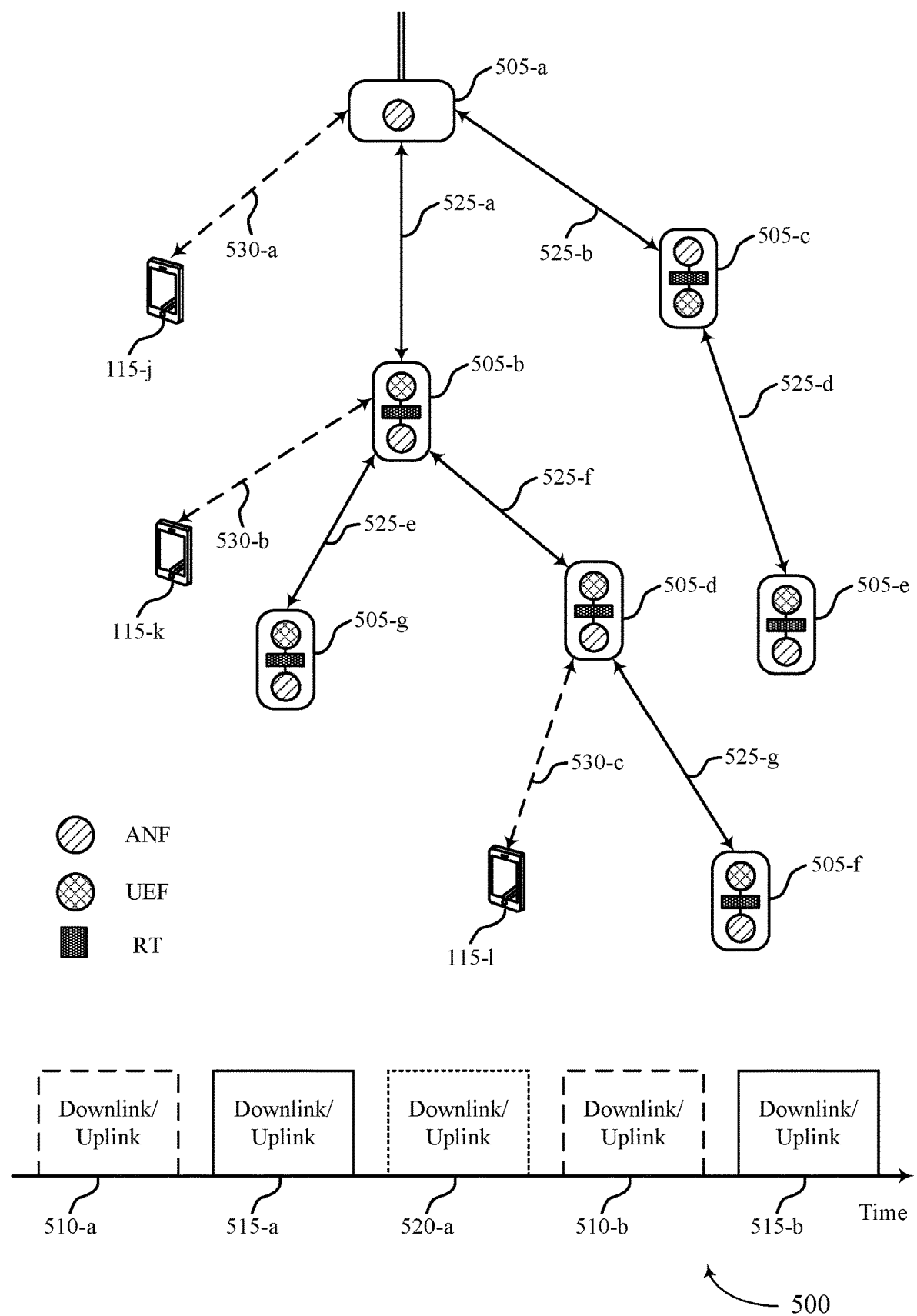
FIG. 5 illustrates an example of a wireless communications system in accordance with aspects of the present disclosure.

FIG. 5 illustrates an example of a wireless communications system 500 that supports resource partitioning between access and backhaul communication links in accordance with various aspects of the present disclosure. In some cases, the wireless communications system 500 may implement aspects of wireless communications systems 100, 200, and/or 400, and may be an example of a wireless communications network that operates in mmW spectrum. The wireless communications system 500 may include a number of access nodes ANs 505 (ANs 505-a, 505-b, etc.) and UEs 115 (UE 115-j, UE 115-k, etc.) that communicate over a combination of wired and wireless links. The ANs 505 may be examples of the ANs 105 and 205 as described in reference to FIGS. 1 and 2.

In some cases, anchor AN 505-a may be connected to a first set of nodes over one or more access links and backhaul links. For example, AN 505-a may communicate with a UE 115-j over access link 530-a, AN 505-b over backhaul link 525-a, and AN 505-c over backhaul link 525-b. Since ANs 505-b and 505-c include an ANF, they may further be connected to ANs 505-g, 505-d, and 505-e. For example, AN 505-b may communicate with AN 505-g and AN 505-d over backhaul links 525-e and 525-f, respectively, and may communicate with UE 115-k over access link 530-b. In some cases, AN 505-c may communicate with AN 505-e over backhaul link 525-d. Additionally, AN 505-d may communicate with AN 505-f and UE 115-1 over backhaul link 525-g and access link 530-c, respectively.

As described above, a set of time-frequency resources may be partitioned for all or some of the access and backhaul links between anchor AN 505-a, other ANs 505, and the UEs 115. For example, the set of time-frequency resources may be partitioned into three sets for downlink and/or uplink transmissions (e.g., downlink/uplink resources 510, 515, and 520). As shown, the time-frequency resources are partitioned based on the time domain (e.g., a number of symbols for each set), where the sets alternate according to defined repetition pattern. The first set of resources may include downlink/uplink resources 510-a and 510-b. Alternatively, the second set of resources may include downlink/uplink resources 515-a and 515-b, and the third set may include downlink/uplink resources 520-a.

In some cases, there may be at least one non-empty set of resources reserved for one type of link (e.g., access or backhaul), and each set of resources may be allocated to corresponding links and may alternate per each hop. For instance, AN 505-b may be assigned a set of wireless resources from AN 505-a, and may reserve a first subset of resources from the set for access traffic communications with UE 115-j. In some cases, the first subset of resources may be reassigned or repurposed for backhaul links (e.g., for communications with AN 505-g or AN 505-d), for instance, based on light access traffic. In some cases (as illustrated), the overall set of resources may be partitioned into distinct sets of resources, for access and backhaul. For example, access links 530-a, 530-b, and 530-c may utilize the first set of downlink/uplink resources 510-a and 510-b, backhaul links 525-a, 525-b, and 525-f may utilize the second set of downlink/uplink resources 515-a, and backhaul links 525-c and 525-d may utilize a third set of downlink/uplink resources 520-a. Within a star, an AN 505 that includes an ANF may allocate the resources to each of its constituent links.

In some cases, the resource allocation may be determined using one or more schemes. In a first scheme, resource allocation may be determined by a centralized scheduler (not shown), which may be referred to as a centralized scheme. In some other cases, a distributed scheme may be implemented, where one or more ANs 505 may exchange signaling, and resource allocation may be determined based on the exchanged signaling. In some cases, signaling may comprise requests from an AN 505 to the scheduler or to other ANs 505, and may involve one or more ANs 505 exchanging measurements or reports such as BSRs, channel quality, beam quality, and/or interference measurements and reports. In some cases, the signaling may include information pertaining to a configuration (e.g., measurement configuration, resource allocation), and transmitted from the scheduler or an AN 505 to one or more other ANs 505. In some cases, signaling may be an indication from an AN 505 to one or more UEs 115 in the same cell, or neighboring cell.

One or more ANs 505 and the scheduler may exchange signaling (e.g., measurement reports) to enable repurposing of resources. In some examples, resources reserved for a particular type of link (e.g., access or backhaul) may be reserved for a specific type of traffic (e.g., control traffic, or data traffic, or broadcast signaling) for the link. In some other cases, resources reserved for a particular type of link may be only for a specific direction (e.g., for downlink or uplink). The resource allocation scheme implemented may be based on the available bandwidth (e.g., combination of access band and backhaul band, sub-6 GHz or mmW).

Figure 6:
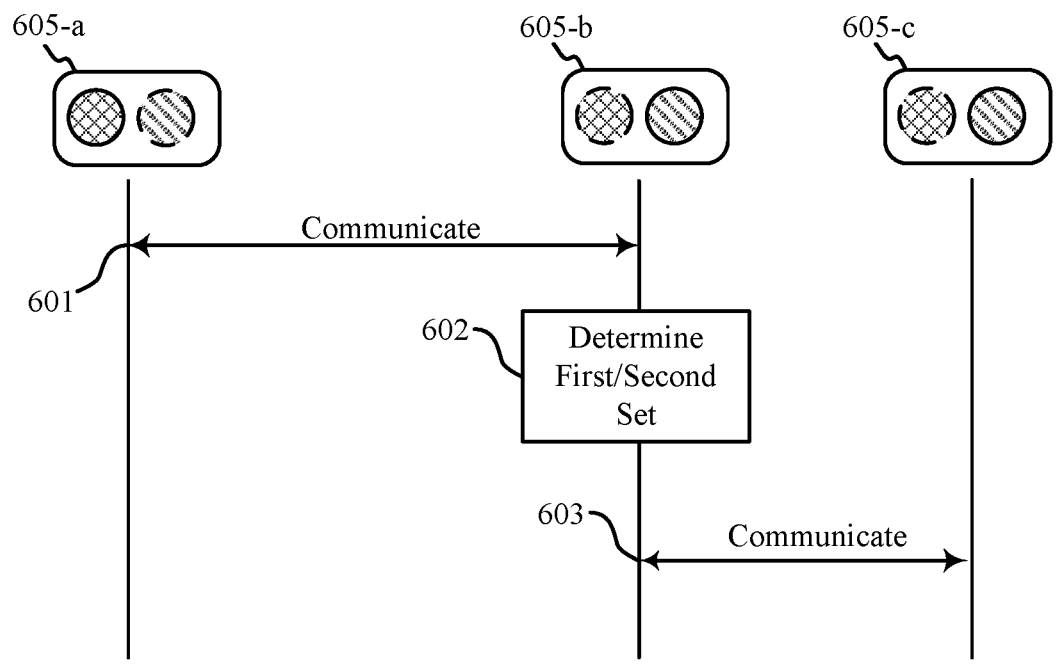
FIG. 6 illustrates an example of a process flow in accordance with aspects of the present disclosure.
Figure 6:
Figure 6:

FIG. 6 illustrates an example of a process flow 600 in accordance with various aspects of the present disclosure. In some examples, process flow 600 may implement aspects of wireless communications system 100, 200, 400, and/or 500, with reference to FIGS. 1, 2, 4, and 5. AN 605-a may be denoted as a scheduling AN (or anchor) and may enable ANF functionality. AN 605-a may implement UEF functionality for communication with an alternative entity coupled to AN 605-a, or for topological redundancy in the network. AN 605-b may be denoted as a receiving AN and may enable UEF functionality. In some cases, AN 605-b may additionally implement ANF functionality for communication with an alternative entity coupled to AN 605-b and AN 605-c may be representative of a UE 115 for integrated mobile access.

In the following description of the process flow 600, the operations between ANs 605-a, 605-b, and 605-c may correspond to uplink or downlink signaling over wireless backhaul links and/or wireless access links. Signaling between AN 605-a and AN 605-b may be direct, or indirect, according to a mesh topology of the backhaul network.

At 601, AN 605-b may receive communications from AN 605-a, providing an indication of a set of time-frequency resources reserved for communications of a first link type (e.g., access link). In some cases, the communications may be received via a channel associated with a second link type (e.g., backhaul link), which may be received over a second set of time-frequency resources. Alternatively or additionally, AN 605-b may receive a resource configuration from AN 605-a, a scheduler (not shown) of the communication network, or another wireless device. In some cases, the communications may further comprise receiving a report from AN 605-a, where the report may originate from AN 605-c, another wireless device, or a neighboring AN of the communications. In some cases, the report may include a BSR, a channel quality measurement report, a beam quality measurement report, an interference measurement report, or any combination thereof.

At 602, AN 605-*b* may determine a first or a second set of time-frequency resources reserved for communications of the first link type and second link type, respectively. In some cases, AN 605-*b* may determine the sets based in part on the report, or resource configuration received at 601. In some examples, the first and second sets of time-frequency resources may partially overlap and the first and second sets of resources may each be associated with a set of spatial or code resources. In some instances, AN 605-*b* may repurpose a subset of time-frequency resources for communications of the second link type, as described above with reference to FIGS. 2 and 5. In some aspects, AN 605-*b* may transmit a repurposing message to a scheduler or AN (not shown) to repurpose at least a portion of the set of time-frequency resources. Further, AN 605-*b* may receive a repurposing response message that indicates the subset of time-frequency resources reserved for communications of the second link type. In some cases, the first set of time-frequency resources may be reserved for one of control traffic, data traffic, or broadcast signaling; or one of downlink or uplink communications. In some cases, the first set of time-frequency resources may be based at least in part on a preconfigured resource allocation scheme for the communication network.

At 603, AN 605-*b* may communicate with AN 605-*c* via a channel associated with the first link type, and using the first set of time-frequency resources.

Figure 7:
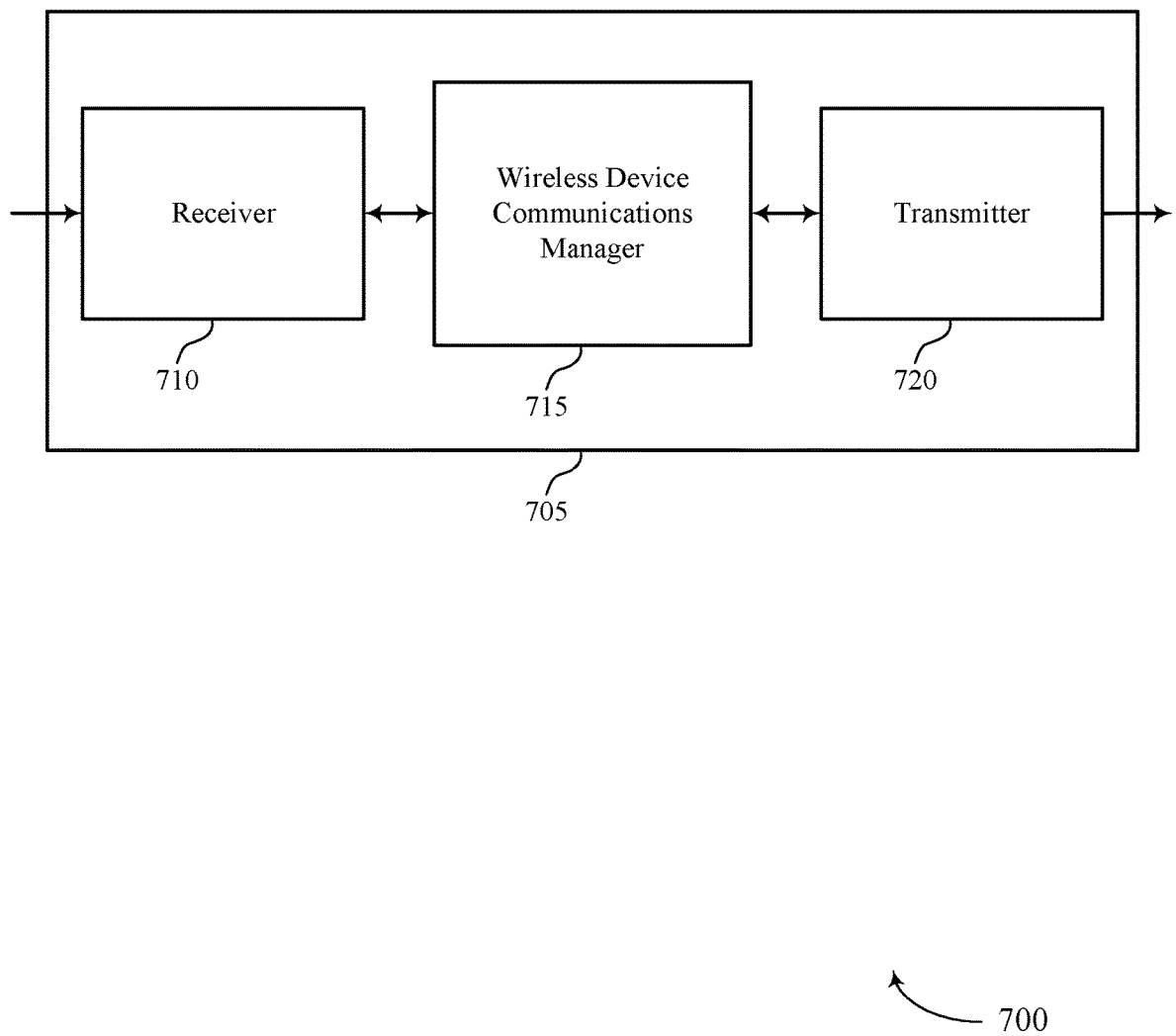
FIGS. 7 through 9 show block diagrams of a device in accordance with aspects of the present disclosure.

FIG. 7 shows a block diagram 700 of a wireless device 705 in accordance with aspects of the present disclosure. Wireless device 705 may be an example of aspects of a relay device (an AN, a base station, etc.) as described herein. Wireless device 705 may include receiver 710, wireless device communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource partitioning between access and backhaul communication links, etc.). Information may be passed on to other components of the device. The receiver 710 may be an example of aspects of the transceiver 1035 described with reference to FIG. 10. The receiver 710 may utilize a single antenna or a set of antennas.

Wireless device communications manager 715 may be an example of aspects of the wireless device communications manager 1015 described with reference to FIG. 10. Wireless device communications manager 715 and/or at least some of its various sub-components may be implemented in hardware, software executed by a processor, firmware, or any combination thereof. If implemented in software executed by a processor, the functions of the wireless device communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless device communications manager 715 and/or at least some of its various sub-components may be physically located at various positions, including being distributed such that portions of functions are implemented at different physical locations by one or more physical devices. In some examples, wireless device communications manager 715 and/or at least some of its various sub-components may be a separate and distinct component in accordance with various aspects of the present disclosure. In other examples, wireless device communications manager 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Wireless device communications manager 715 may identify a set of time-frequency resources reserved for communications of a first link type, where the first link type includes one of a backhaul link or an access link and communicate with a wireless device in a communications network via a channel associated with the first link type using the set of time-frequency resources.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
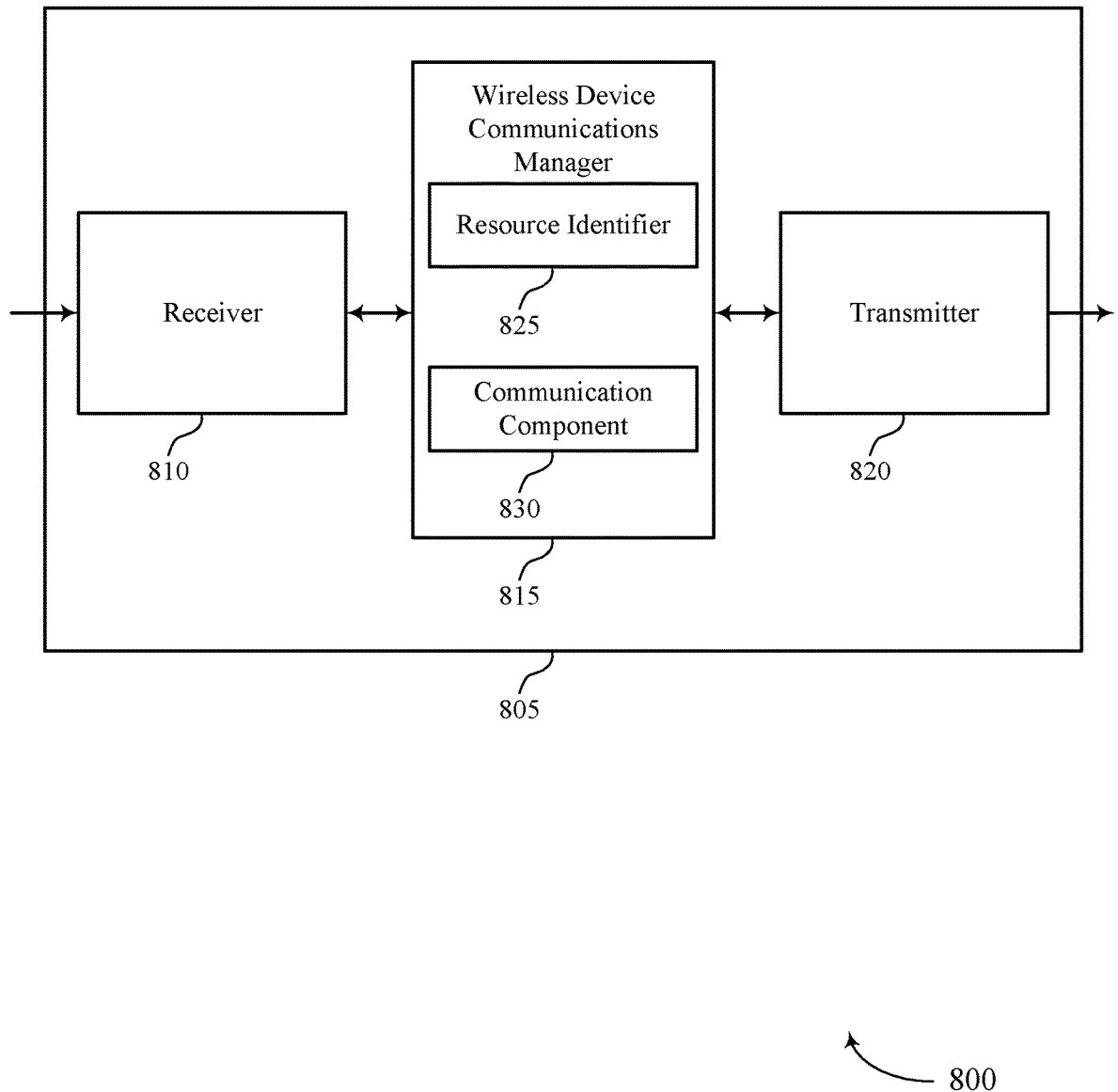

FIG. 8 shows a block diagram 800 of a wireless device 805 in accordance with aspects of the present disclosure. Wireless device 805 may be an example of aspects of a wireless device 705 or a relay device (an AN, a base station, etc.) as described with reference to FIG. 7. Wireless device 805 may include receiver 810, wireless device communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource partitioning between access and backhaul communication links, etc.). Information may be passed on to other components of the device. The receiver 810 may be an example of aspects of the transceiver 1035 described with reference to FIG. 10. The receiver 810 may utilize a single antenna or a set of antennas.

Wireless device communications manager 815 may be an example of aspects of the wireless device communications manager 1015 described with reference to FIG. 10. Wireless device communications manager 815 may also include resource identifier 825 and communication component 830.

Resource identifier 825 may identify a set of time-frequency resources reserved for communications of a first link type, where the first link type includes one of a backhaul link or an access link and identify a second set of time-frequency resources reserved for communications of a second link type different from the first link type. In some cases, the second set of time-frequency resources and the set of time-frequency resources at least partially overlap. In some examples, the set of time-frequency resources is associated with a first set of spatial or code resources and the second set of time-frequency resources is associated with a second set of spatial or code resources different from the first set of spatial or code resources. In some aspects, the set of time-frequency resources are reserved for one of control traffic, data traffic, or broadcast signaling. In some instances, the set of time-frequency resources are reserved for one of downlink communications or uplink communications. In some cases, the set of time-frequency resources is based on a preconfigured resource allocation scheme for the communications network.

Communication component 830 may communicate with a wireless device in a communications network via a channel associated with the first link type using the set of time-frequency resources. Communication component 830 may communicate with a network node in the communications network via a second channel associated with the second link type using the second set of time-frequency resources. Communication component 830 may communicate with a network node in the communications network via a second channel associated with the second link type using the subset of time-frequency resources.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
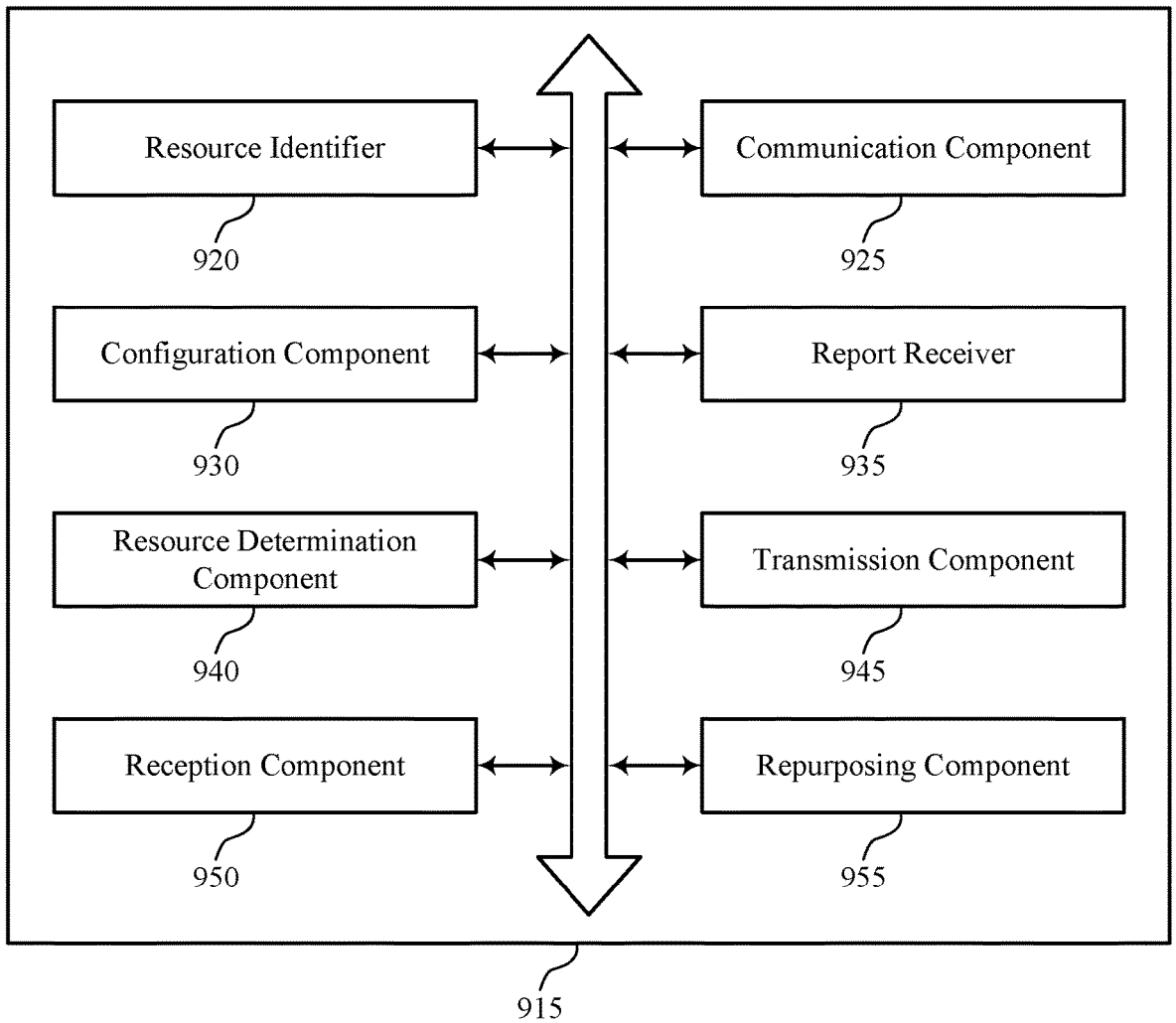

FIG. 9 shows a block diagram 900 of a wireless device communications manager 915 in accordance with aspects of the present disclosure. The wireless device communications manager 915 may be an example of aspects of a wireless device communications manager 715, a wireless device communications manager 815, or a wireless device communications manager 1015 described with reference to FIGS. 7, 8, and 10. The wireless device communications manager 915 may include resource identifier 920, communication component 925, configuration component 930, report receiver 935, resource determination component 940, transmission component 945, reception component 950, and repurposing component 955. Each of these modules may communicate, directly or indirectly, with one another (e.g., via one or more buses).

Resource identifier 920 may identify a set of time-frequency resources reserved for communications of a first link type, where the first link type includes one of a backhaul link or an access link and identify a second set of time-frequency resources reserved for communications of a second link type different from the first link type. In some cases, the second set of time-frequency resources and the set of time-frequency resources at least partially overlap. In some examples, the set of time-frequency resources is associated with a first set of spatial or code resources and the second set of time-frequency resources is associated with a second set of spatial or code resources different from the first set of spatial or code resources. In some aspects, the set of time-frequency resources are reserved for one of control traffic, data traffic, or broadcast signaling. In some instances, the set of time-frequency resources are reserved for one of downlink communications or uplink communications. In some cases, the set of time-frequency resources is based on a preconfigured resource allocation scheme for the communications network.

Communication component 925 may communicate with a wireless device in a communications network via a channel associated with the first link type using the set of time-frequency resources. Communication component 925 may communicate with a network node in the communications network via a second channel associated with the second link type using the second set of time-frequency resources. Communication component 925 may communicate with a network node in the communications network via a second channel associated with the second link type using the subset of time-frequency resources.

Configuration component 930 may receive a resource configuration from the wireless device, the network node, another wireless device, or a scheduler of the communications network. In some cases, the resource configuration conveys at least one of the set of time-frequency resources or the second set of time-frequency resources.

Report receiver 935 may receive a report from a network node in the communications network, where the report is received from the wireless device or a neighboring access node of the communications network. In some cases, the report includes a BSR, a channel quality measurement report, a beam quality measurement report, an interference measurement report, or any combination thereof.

Resource determination component 940 may determine at least one of the set of time-frequency resources reserved for communications of the first link type or the second set of time-frequency resources for communication of the second link type based on the report and determine the set of time-frequency resources reserved for communications of the first link type or the second type based on the report.

Transmission component 945 may transmit, to the wireless device or a network node, an indication of at least one of the set of time-frequency resources or the second set of time-frequency resources and transmit, to the wireless device or a network node, an indication of time-frequency resources associated with a network node and reserved for communications of the first link type. Transmission component 945 may transmit, to a scheduler in the communications network, a request for resources for communications of the first link type or the second link type and transmit, to the wireless device or a network node, an indication of the set of time-frequency resources.

Reception component 950 may receive, from the scheduler, a response to the request for resources that indicates the set of time-frequency resources reserved for communications of the first link type or the second set of time-frequency resources reserved for communications of the second link type.

Repurposing component 955 may repurpose a subset of time-frequency resources for communications of a second link type different from the first link type and receive, from the scheduler or the access node of the communications network, a repurposing response message that indicates the subset of time-frequency resources reserved for communications of the second link type. In some cases, repurposing the subset of time-frequency resources includes: transmitting, to a scheduler or an access node of the communications network, a repurposing message to repurpose at least a portion of the set of time-frequency resources.

Figure 10:
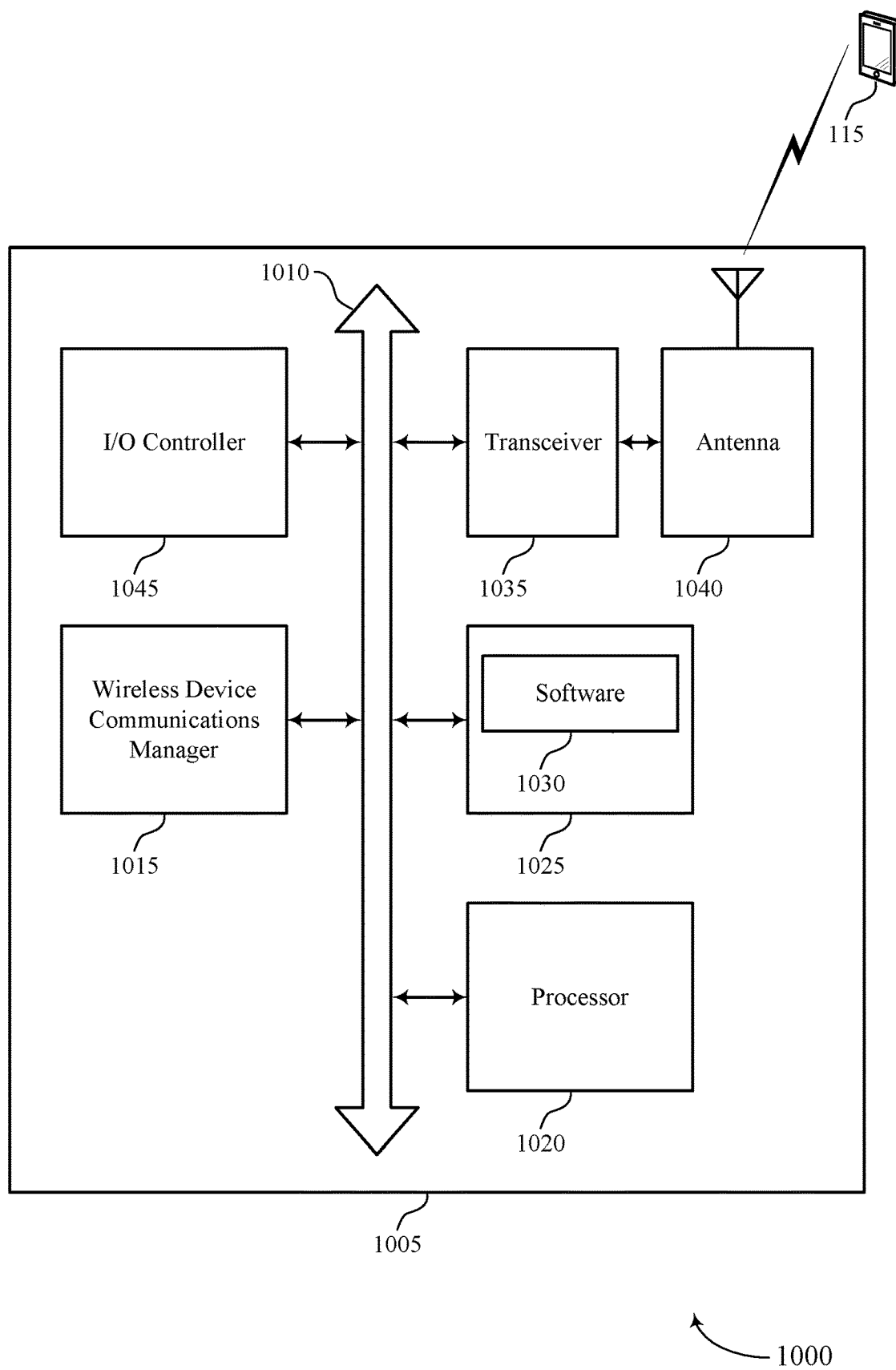
FIG. 10 illustrates a block diagram of a system including a user equipment (UE) in accordance with aspects of the present disclosure.

FIG. 10 shows a diagram of a system 1000 including a device 1005 in accordance with aspects of the present disclosure. Device 1005 may be an example of or include the components of wireless device 705, wireless device 805, or a relay device (an AN, a base station, etc.) as described herein, e.g., with reference to FIGS. 7 and 8. Device 1005 may include components for bi-directional voice and data communications including components for transmitting and receiving communications, including wireless device communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting resource partitioning between access and backhaul communication links).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic I/O system (BIOS) which may control basic hardware or software operation such as the interaction with peripheral components or devices.

Software 1030 may include code to implement aspects of the present disclosure, including code to support resource partitioning between access and backhaul communication links. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the device 1005 may include a single antenna 1040, or the device 1005 may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
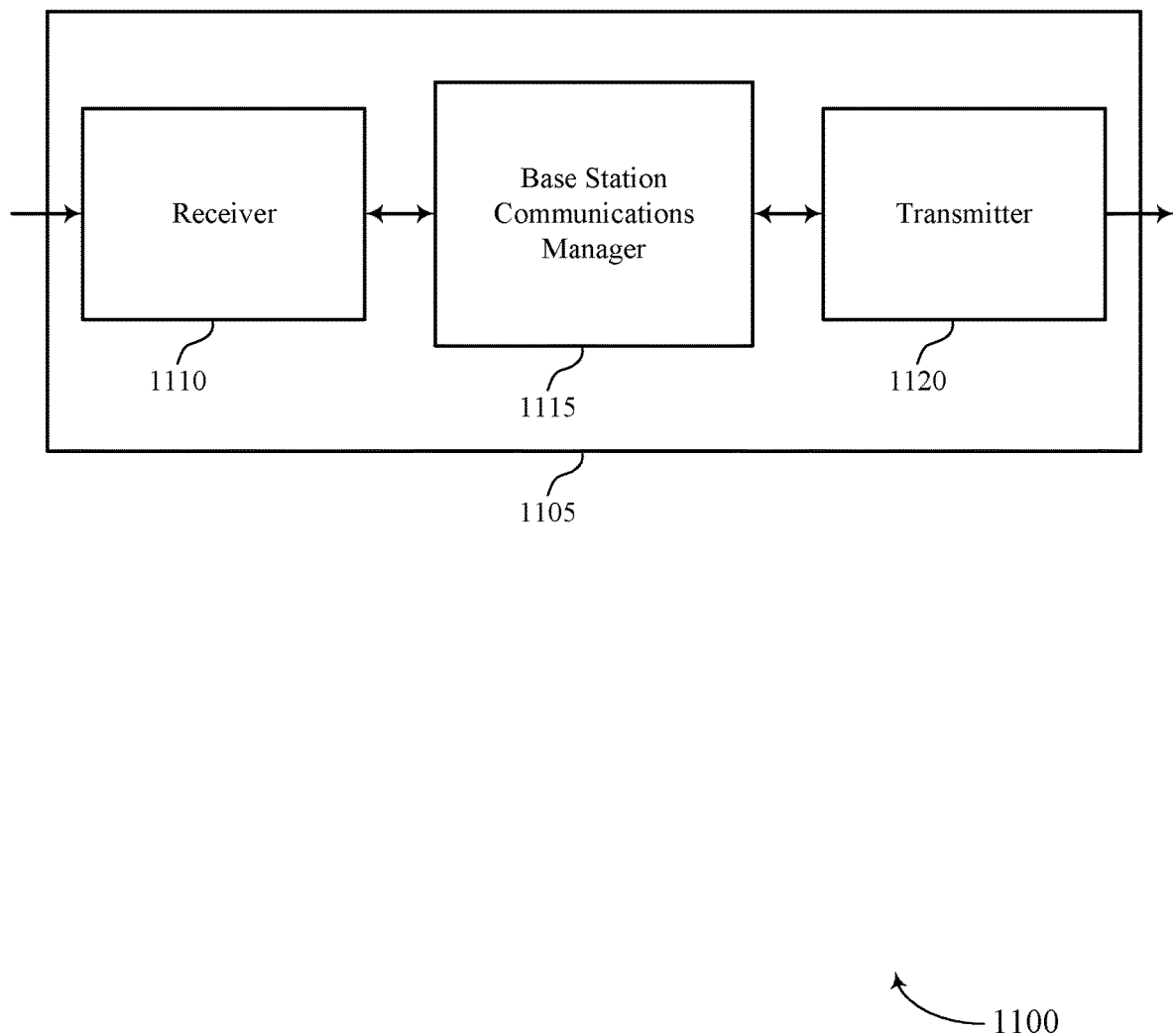
FIGS. 11 through 13 show block diagrams of a device in accordance with aspects of the present disclosure.

FIG. 11 shows a block diagram 1100 of a wireless device 1105 in accordance with aspects of the present disclosure. Wireless device 1105 may be an example of aspects of a scheduler, an AN, or a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to resource partitioning between access and backhaul communication links, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may allocate a set of time-frequency resources reserved for communications of a first link type, where the first link type includes one of a backhaul link or an access link and transmit, to an access node in a communications network, a resource configuration that conveys the set of time-frequency resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
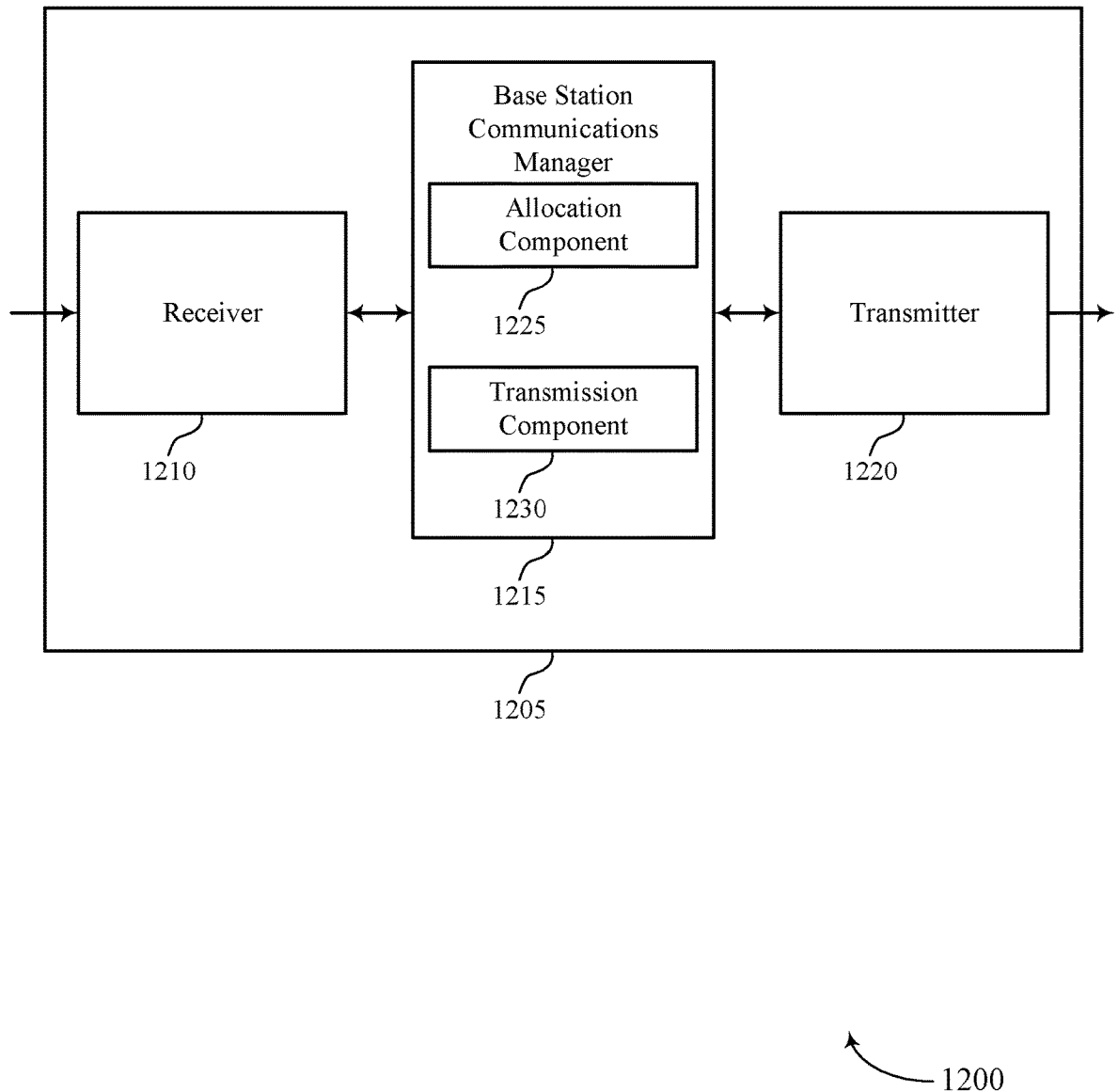

FIG. 12 shows a block diagram 1200 of a wireless device 1205 in accordance with aspects of the present disclosure. Wireless device 1205 may be an example of aspects of a wireless device 1105, scheduler, AN, or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resource partitioning between access and backhaul communication links, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include allocation component 1225 and transmission component 1230.

Allocation component 1225 may allocate a set of time-frequency resources reserved for communications of a first link type, where the first link type includes one of a backhaul link or an access link. In some cases, the set of time-frequency resources is associated with a first set of spatial or code resources. In some examples, the set of time-frequency resources are reserved for one of control traffic, data traffic, or broadcast signaling. In some instances, the set of time-frequency resources are reserved for one of downlink communications or uplink communications. In some aspects, the set of time-frequency resources is based on a preconfigured resource allocation scheme for the communications network.

Transmission component 1230 may transmit, to an access node in a communications network, a resource configuration that conveys the set of time-frequency resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
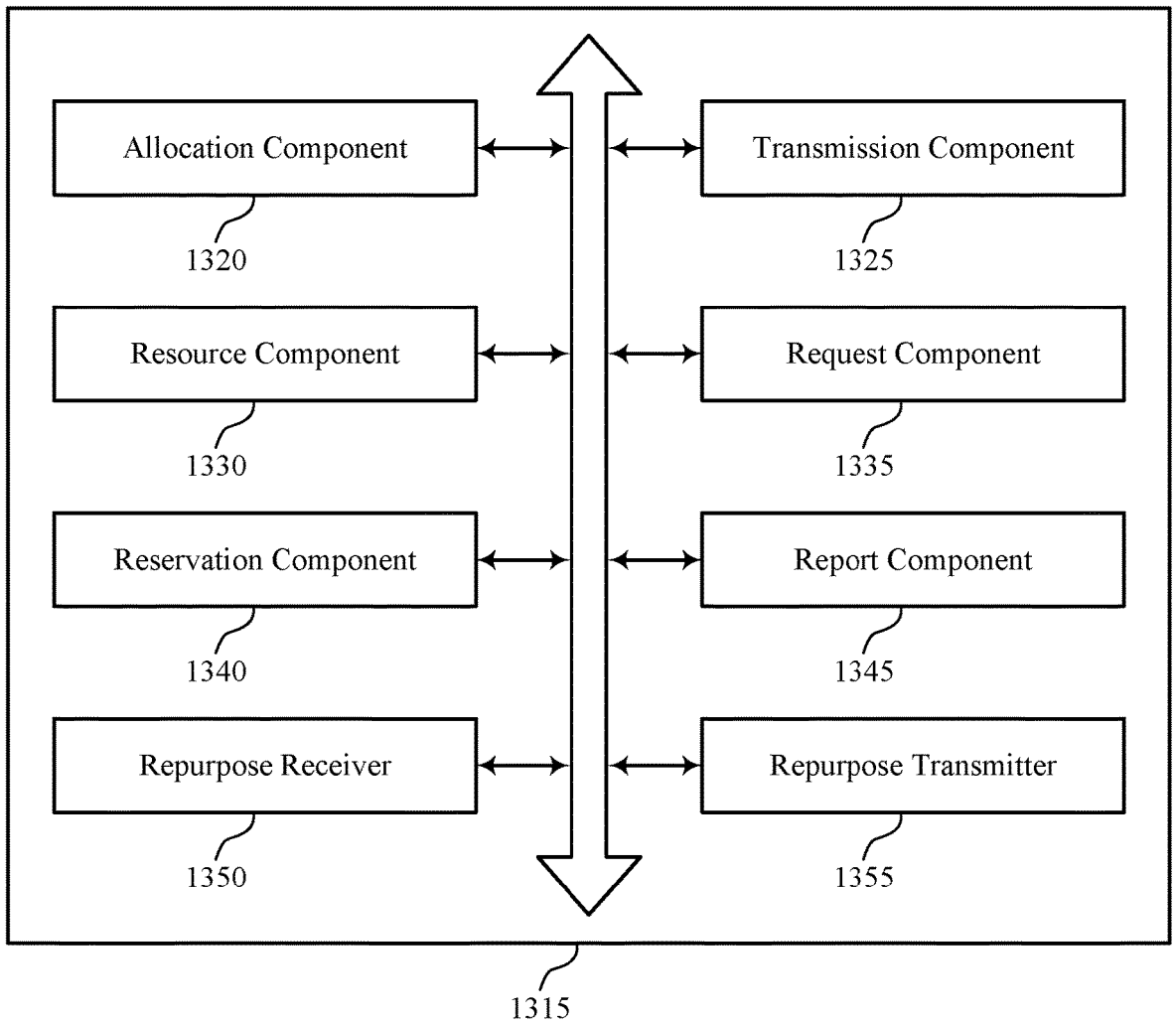

FIG. 13 shows a block diagram 1300 of a base station communications manager 1315 in accordance with aspects of the present disclosure. The base station communications manager 1315 may be an example of aspects of a base station communications manager 1415 described with reference to FIGS. 11, 12, and 14. The base station communications manager 1315 may include allocation component 1320, transmission component 1325, resource component 1330, request component 1335, reservation component 1340, report component 1345, repurpose receiver 1350, and repurpose transmitter 1355. Each of these modules may communicate, directly or indirectly, with one another (e.g., via one or more buses).

Allocation component 1320 may allocate a set of time-frequency resources reserved for communications of a first link type, where the first link type includes one of a backhaul link or an access link. In some cases, the set of time-frequency resources is associated with a first set of spatial or code resources. In some examples, the set of time-frequency resources are reserved for one of control traffic, data traffic, or broadcast signaling. In some aspects, the set of time-frequency resources are reserved for one of downlink communications or uplink communications. In some instances, the set of time-frequency resources is based on a preconfigured resource allocation scheme for the communications network.

Transmission component 1325 may transmit, to an access node in a communications network, a resource configuration that conveys the set of time-frequency resources.

Resource component 1330 may identify a second set of time-frequency resources reserved for communications of a second link type different from the first link type, where the resource configuration conveys at least one of the set of time-frequency resources or the second set of time-frequency resources. In some cases, the second set of time-frequency resources and the set of time-frequency resources at least partially overlap. In some examples, the set of time-frequency resources is associated with a first set of spatial or code resources and the second set of time-frequency resources is associated with a second set of spatial or code resources different from the first set of spatial or code resources.

Request component 1335 may receive, from the access node, a request for resources for communications of the first link type.

Reservation component 1340 may reserve the set of time-frequency resources for communications of the first link type based on the request for resources and reserve the set of time-frequency resources for communications of the first link type based on the report.

Report component 1345 may receive, from the access node, a report corresponding to one or more devices in the communications network. In some cases, the report includes a BSR, a channel quality measurement report, a beam quality measurement report, an interference measurement report, or any combination thereof.

Repurpose receiver 1350 may receive, from the access node, a repurposing message to repurpose at least a portion of the set of time-frequency resources for communications of a second link type different from the first link type.

Repurpose transmitter 1355 may transmit, to the access node of the communications network, a repurposing response message that indicates a subset of time-frequency resources reserved for communications of the second link type.

Figure 14:
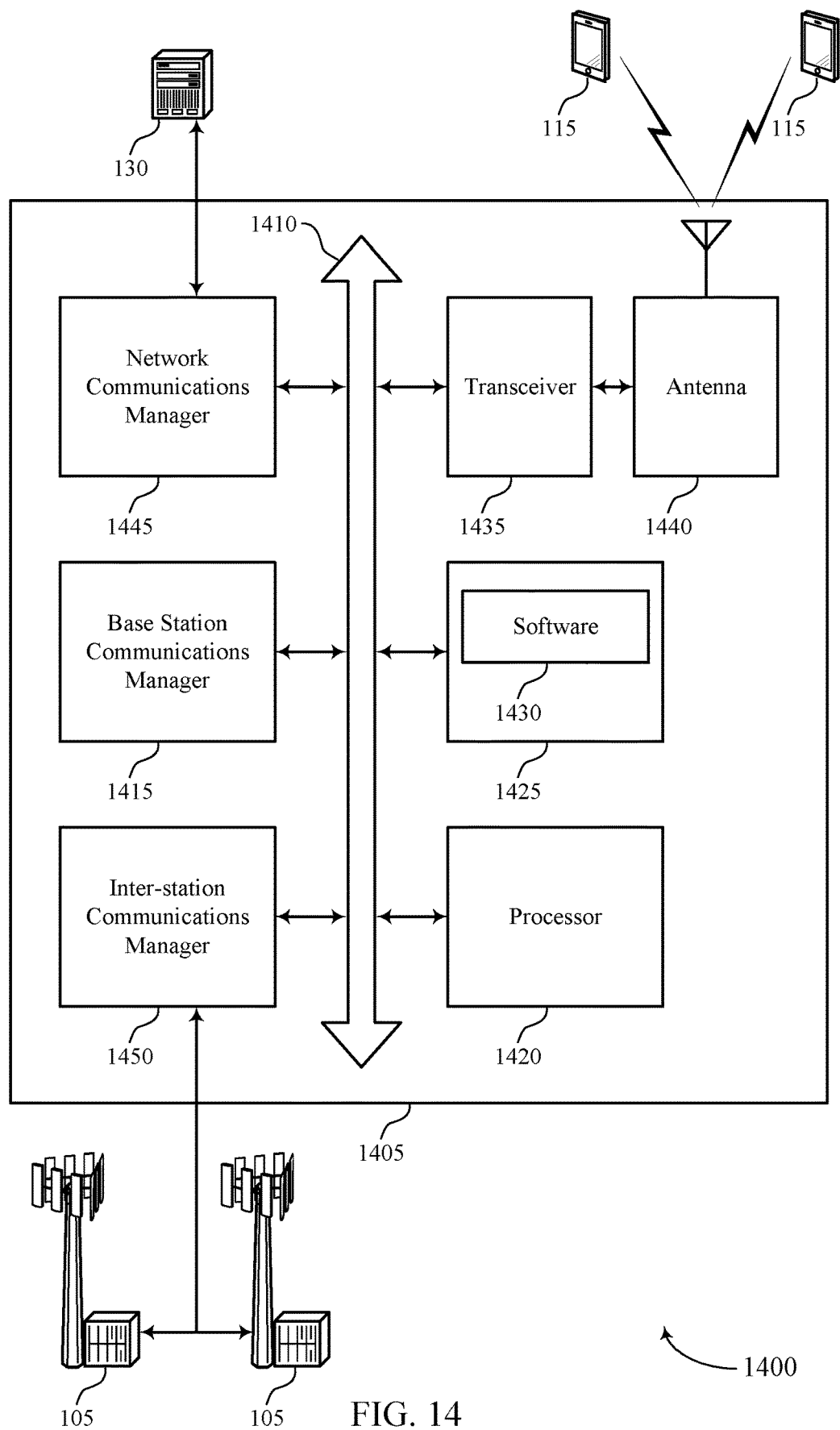
FIG. 14 illustrates a block diagram of a system including a base station in accordance with aspects of the present disclosure.

FIG. 14 shows a diagram of a system 1400 including a device 1405 in accordance with aspects of the present disclosure. Device 1405 may be an example of or include the components of base station 105, scheduler, or AN, as described herein. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting resource partitioning between access and backhaul communication links).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support resource partitioning between access and backhaul communication links. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the device 1405 may include a single antenna 1440, or the device 1405 may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
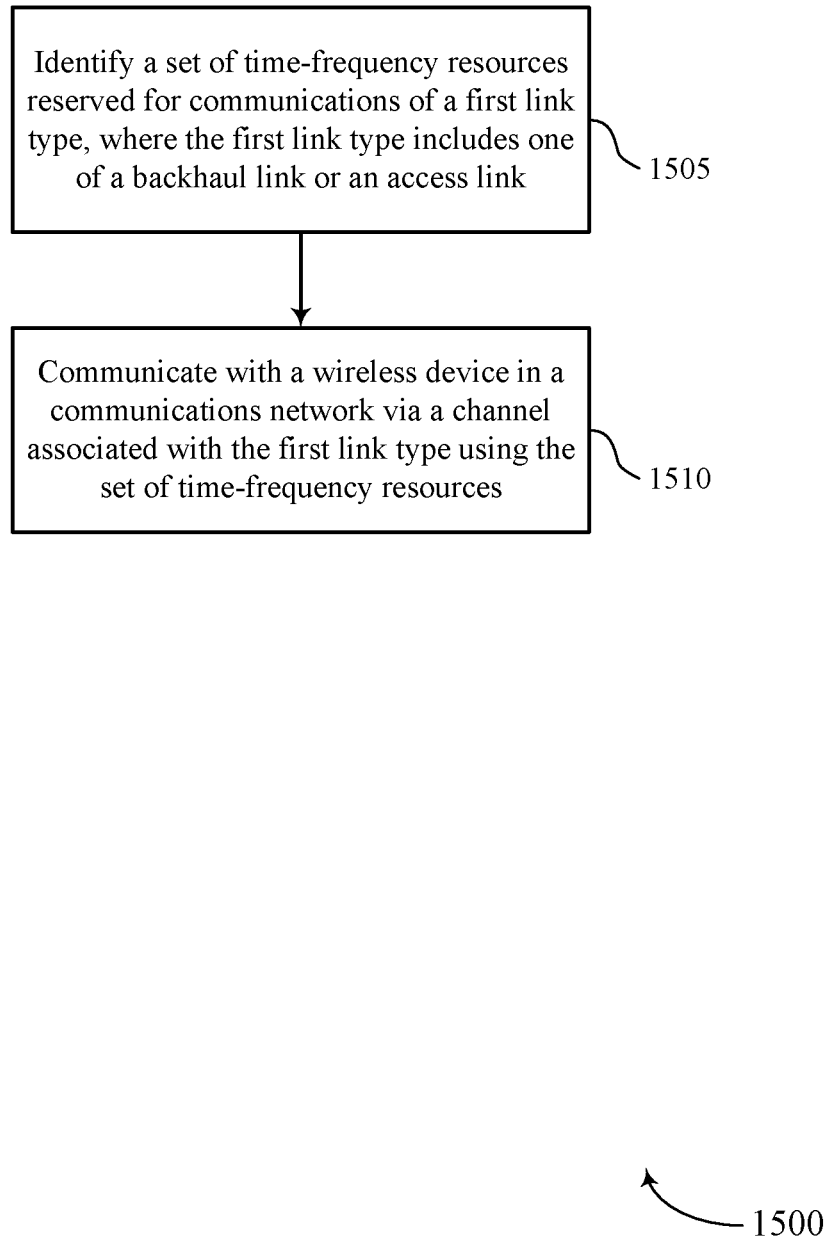
FIGS. 15 and 16 illustrate methods for resource partitioning in accordance with aspects of the present disclosure.

FIG. 15 shows a flowchart illustrating a method 1500 in accordance with aspects of the present disclosure. The operations of method 1500 may be implemented by a relay device (an AN, a base station, etc.) or its components as described herein. For example, the operations of method 1500 may be performed by a wireless device communications manager as described with reference to FIGS. 7 through 10. In some examples, a relay device (an AN, a base station, etc.) may execute a set of codes to control the functional elements of the device to perform the functions described below. Additionally or alternatively, the relay device (an AN, a base station, etc.) may perform aspects of the functions described below using special-purpose hardware.

At 1505, the relay device (an AN, a base station, etc.) may identify a set of time-frequency resources reserved for communications of a first link type, wherein the first link type comprises one of a backhaul link or an access link. The operations of 1505 may be performed according to the methods described herein. In certain examples, aspects of the operations of 1505 may be performed by a resource identifier as described with reference to FIGS. 7 through 10.

At 1510, the relay device (an AN, a base station, etc.) may communicate with a wireless device in a communications network via a channel associated with the first link type using the set of time-frequency resources. The operations of 1510 may be performed according to the methods described herein. In certain examples, aspects of the operations of 1510 may be performed by a communication component as described with reference to FIGS. 7 through 10.

Figure 16:
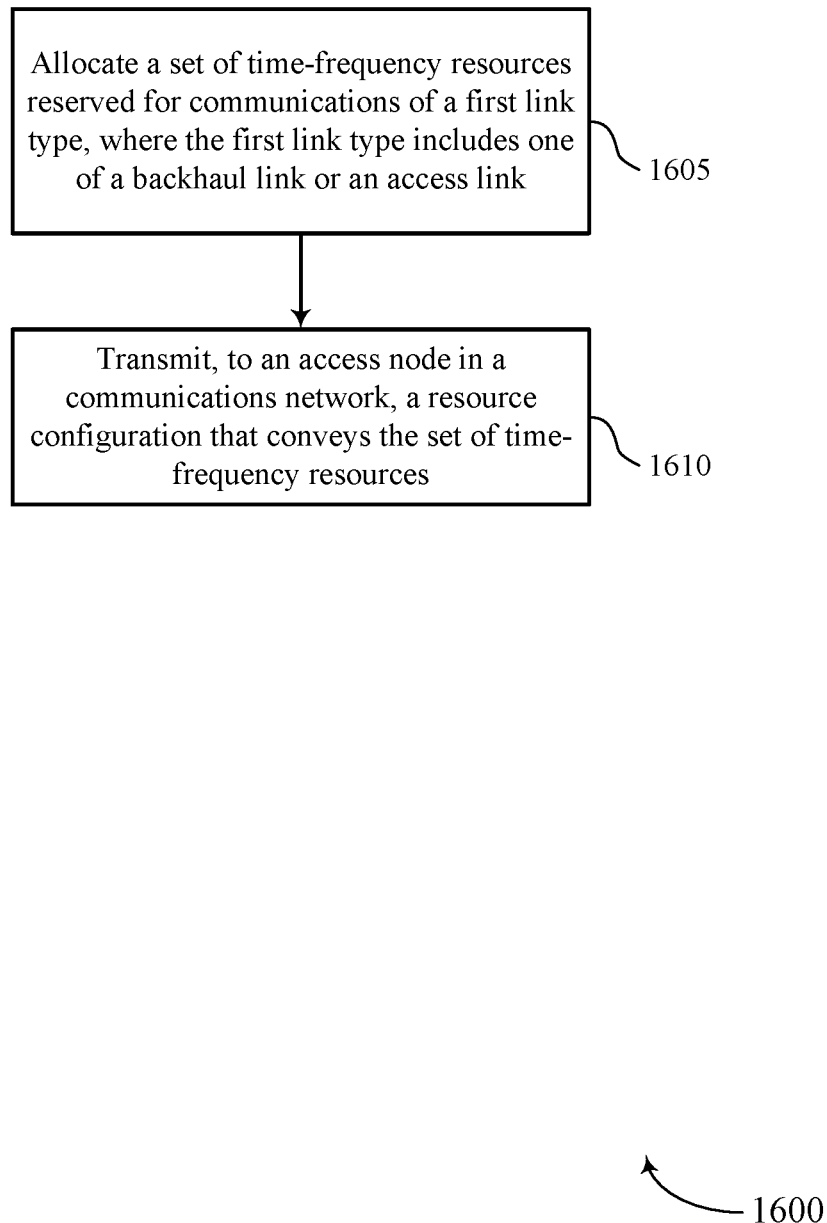

FIG. 16 shows a flowchart illustrating a method 1600 in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may allocate a set of time-frequency resources reserved for communications of a first link type, wherein the first link type comprises one of a backhaul link or an access link. The operations of 1605 may be performed according to the methods described herein. In certain examples, aspects of the operations of 1605 may be performed by an allocation component as described with reference to FIGS. 11 through 14.

At 1610, the base station 105 may transmit, to an access node in a communications network, a resource configuration that conveys the set of time-frequency resources. The operations of 1610 may be performed according to the methods described herein. In certain examples, aspects of the operations of 1610 may be performed by a transmission component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a first set of time-frequency resources reserved for communications of a first link type, wherein the first link type comprises one of a backhaul link or an access link;
   communicating with a wireless device in a communications network via a channel associated with the first link type using the first set of time-frequency resources;
   communicating with a scheduler or an access node of the communications network to repurpose a subset of the first set of time-frequency resources for communications of a second link type different from the first link type; and
   using time-frequency resources included in the subset of the first set of time-frequency resources to communicate with at least a first network node in the communications network via a second channel associated with the second link type.

2. The method of claim 1, further comprising:
   identifying a second set of time-frequency resources reserved for communications of the second link type different from the first link type; and
   communicating with at least a second network node in the communications network via the second channel associated with the second link type using the second set of time-frequency resources, wherein the second network node is the same network node or a different network node than the first network node.

3. The method of claim 2, further comprising:
   receiving a resource configuration with at least one of the set of time-frequency resources, the subset of time-frequency resources, or the second set of time-frequency resources.

4. The method of claim 2, further comprising:
   receiving a report from the wireless device or a neighboring access node of the communications network; and
   determining at least one of the first set of time-frequency resources reserved for communications of the first link type or the second set of time-frequency resources for communication of the second link type based at least in part on the report.

5. The method of claim 2, further comprising:
   transmitting an indication of at least one of the first set of time-frequency resources or the second set of time-frequency resources.

6. The method of claim 2, further comprising:
   transmitting an indication of time-frequency resources associated with a network node and reserved for communications of the first link type.

7. The method of claim 2, further comprising:
   transmitting, to the scheduler in the communications network, a request for resources for communications of the first link type or the second link type; and
   receiving, from the scheduler, a response to the request for resources that indicates the first set of time-frequency resources reserved for communications of the first link type or the second set of time-frequency resources reserved for communications of the second link type.

8. The method of claim 2, wherein the second set of time-frequency resources and the first set of time-frequency resources at least partially overlap.

9. The method of claim 2, wherein the first set of time-frequency resources is associated with a first set of spatial or code resources and the second set of time-frequency resources is associated with a second set of spatial or code resources different from the first set of spatial or code resources.

10. The method of claim 1, further comprising:
    receiving a resource configuration from the wireless device, a network node, another wireless device, or the scheduler of the communications network.

11. The method of claim 1, further comprising:
    receiving at least one report from the wireless device or a neighboring access node in the communications network, wherein the report comprises a buffer status report, a channel quality measurement report, a beam quality measurement report, an interference measurement report, or any combination thereof; and
    determining the first set of time-frequency resources reserved for communications of the first link type based at least in part on the at least one report.

12. The method of claim 1, further comprising:
    transmitting an indication of the set of time-frequency resources.

13. The method of claim 1, further comprising:
    transmitting an indication of time-frequency resources associated with a network node and reserved for communications of the first link type.

14. The method of claim 1, further comprising:
    transmitting, to the scheduler in the communications network, a request for resources for communications of the first link type; and
    receiving, from the scheduler, a response to the request for resources that indicates the set of first time-frequency resources reserved for communications of the first link type.

15. The method of claim 1,
    wherein communicating with the scheduler or the access node of the communications network to repurpose the subset of the first set of time-frequency resources for communications of the second link type different from the first link type comprises transmitting, to the scheduler or the access node of the communications network, a repurposing message to repurpose at least a portion of the first set of time-frequency resources; and
    receiving, from the scheduler or the access node of the communications network, a repurposing response message that indicates the subset of the first set of time-frequency resources reserved for communications of the second link type.

16. The method of claim 1, wherein the first set of time-frequency resources is associated with a first set of spatial or code resources.

17. The method of claim 1, wherein the first set of time-frequency resources are reserved for one of control traffic, data traffic, or broadcast signaling, and for one of downlink communications or uplink communications.

18. The method of claim 1, wherein the first set of time-frequency resources is based at least in part on a preconfigured resource allocation scheme for the communications network.

19. A method for wireless communications, comprising:
allocating a first set of time-frequency resources reserved for communications of a first link type, wherein the first link type comprises one of a backhaul link or an access link;
transmitting, to an access node in a communications network, a resource configuration that conveys the first set of time-frequency resources;
receiving, from the access node, a repurposing message to repurpose at least a portion of the first set of time-frequency resources for communications of a second link type different from the first link type; and
transmitting, to the access node of the communications network, a repurposing response message that indicates a subset of the first set of time-frequency resources reserved for communications of the second link type.

20. The method of claim 19, further comprising:
identifying a second set of time-frequency resources reserved for communications of a second link type different from the first link type, wherein the resource configuration conveys at least one of the first set of time-frequency resources or the second set of time-frequency resources.

21. The method of claim 20, wherein the second set of time-frequency resources and the first set of time-frequency resources at least partially overlap.

22. The method of claim 20, wherein the first set of time-frequency resources is associated with a first set of spatial or code resources and the second set of time-frequency resources is associated with a second set of spatial or code resources different from the first set of spatial or code resources.

23. The method of claim 19, further comprising:
receiving, from the access node, a request for resources for communications of the first link type; and
reserving the first set of time-frequency resources for communications of the first link type based at least in part on the request for resources.

24. The method of claim 19, further comprising:
receiving, from the access node, a report corresponding to one or more devices in the communications network, wherein the report comprises a buffer status report, a channel quality measurement report, a beam quality measurement report, an interference measurement report, or any combination thereof; and
reserving the first set of time-frequency resources for communications of the first link type based at least in part on the report.

25. The method of claim 19, wherein the first set of time-frequency resources is associated with a first set of spatial or code resources.

26. The method of claim 19, wherein the first set of time-frequency resources are reserved for one of control traffic, data traffic, or broadcast signaling, and for one of downlink communications or uplink communications.

27. The method of claim 19, wherein the first set of time-frequency resources is based at least in part on a preconfigured resource allocation scheme for the communications network.

28. An apparatus for wireless communications, comprising:
a processor;
memory in electronic communication with the processor; and
instructions stored in the memory and executable by the processor to cause the apparatus to:
identify a first set of time-frequency resources reserved for communications of a first link type, wherein the first link type comprises one of a backhaul link or an access link;
communicate with a wireless device in a communications network via a channel associated with the first link type using the first set of time-frequency resources;
communicate with a scheduler or an access node of the communications network to repurpose a subset of the first set of time-frequency resources for communications of a second link type different from the first link type; and
use time-frequency resources included in the subset of the first set of time-frequency resources to communicate with at least a first network node in the communications network via a second channel associated with the second link type.

29. An apparatus for wireless communications, comprising:
a processor;
memory in electronic communication with the processor; and
instructions stored in the memory and executable by the processor to cause the apparatus to:
allocate a first set of time-frequency resources reserved for communications of a first link type, wherein the first link type comprises one of a backhaul link or an access link;
transmit, to an access node in a communications network, a resource configuration that conveys the first set of time-frequency resources;
receive, from the access node, a repurposing message to repurpose at least a portion of the first set of time-frequency resources for communications of a second link type different from the first link type; and
transmit, to the access node of the communications network, a repurposing response message that indicates a subset of the first set of time-frequency resources reserved for communications of the second link type.

* * * * *